United States Patent
Yamaguchi et al.

(10) Patent No.: US 9,933,252 B2
(45) Date of Patent: Apr. 3, 2018

(54) SELF-POSITION CALCULATING APPARATUS AND SELF-POSITION CALCULATING METHOD

(71) Applicant: Nissan Motor Co., Ltd., Yokohama-Shi, Kanagawa (JP)

(72) Inventors: Ichiro Yamaguchi, Kanagawa (JP); Hidekazu Nishiuchi, Kanagawa (JP); Norihisa Hiraizumi, Kanagawa (JP); Jun Matsumoto, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/329,897

(22) PCT Filed: Aug. 4, 2014

(86) PCT No.: PCT/JP2014/070480
§ 371 (c)(1),
(2) Date: Jan. 27, 2017

(87) PCT Pub. No.: WO2016/020970
PCT Pub. Date: Feb. 11, 2016

(65) Prior Publication Data
US 2017/0261315 A1    Sep. 14, 2017

(51) Int. Cl.
*G01B 11/26* (2006.01)
*G01B 11/00* (2006.01)
(Continued)

(52) U.S. Cl.
CPC ............ *G01B 11/26* (2013.01); *G01B 11/002* (2013.01); *G06K 9/00798* (2013.01); *G06K 9/4604* (2013.01); *H04N 7/183* (2013.01)

(58) Field of Classification Search
CPC ...................................................... G01B 11/26
See application file for complete search history.

(56) References Cited

U.S. PATENT DOCUMENTS

2009/0309710 A1*  12/2009  Kakinami .............. B60Q 9/004
                                                                  340/435
2011/0074958 A1*   3/2011  Pastrick ................ B60Q 1/2665
                                                                  348/148
(Continued)

FOREIGN PATENT DOCUMENTS

JP       H06325298 A       11/1994
JP       2004177252 A       6/2004
(Continued)

OTHER PUBLICATIONS

D.G. Lowe, "Distinctive Image Features from Scale-Invariant Keypoints", International Journal of Computer Vision 60 (2), pp. 91-110, 2004.

(Continued)

*Primary Examiner* — James Pontius
(74) *Attorney, Agent, or Firm* — Young Basile Hanlon & MacFarlane, P.C.

(57) ABSTRACT

The self-position calculating apparatus includes: a patterned light beam extractor extracting a position of the patterned light beam an image of an area onto which the patterned light beam is projected. The apparatus calculates an orientation angle of the vehicle relative to the road surface from the position of calculates an amount of change in orientation of the vehicle based on temporal changes in multiple feature points on the road surface; and calculates a current position and a current orientation angle of the vehicle by adding the amount of change in the orientation to an initial position and an initial orientation angle of the vehicle. If a detected condition of the patterned light beam is equal to or greater than a threshold value, the patterned light beam extractor extracts the position from a superimposed image by superimposing images.

5 Claims, 21 Drawing Sheets

(51) Int. Cl.
*H04N 7/18* (2006.01)
*G06K 9/00* (2006.01)
*G06K 9/46* (2006.01)

(56) References Cited

U.S. PATENT DOCUMENTS

| | | | |
|---|---|---|---|
| 2011/0293145 A1* | 12/2011 | Nogami | B60R 1/00 |
| | | | 382/103 |
| 2013/0182906 A1 | 7/2013 | Kojo et al. | |
| 2015/0145996 A1* | 5/2015 | Watanabe | G08G 1/09626 |
| | | | 348/148 |
| 2015/0260534 A1* | 9/2015 | Shen | G01C 21/34 |
| | | | 701/408 |
| 2015/0369437 A1* | 12/2015 | Reinprecht | F21S 48/1154 |
| | | | 362/510 |
| 2016/0034771 A1* | 2/2016 | Schamp | G01B 11/2545 |
| | | | 348/148 |
| 2017/0094227 A1* | 3/2017 | Williams | H04N 7/181 |
| 2017/0120904 A1* | 5/2017 | Kentley | B60W 30/09 |
| 2017/0186186 A1* | 6/2017 | Yamaguchi | G06T 7/74 |

FOREIGN PATENT DOCUMENTS

| | | |
|---|---|---|
| JP | 2007256090 A | 10/2007 |
| JP | 2007278951 A | 10/2007 |
| JP | 2008175717 A | 7/2008 |
| JP | 2010101683 A | 5/2010 |
| JP | 2013147114 A | 8/2013 |
| JP | 2013187862 A | 9/2013 |
| WO | 2012172870 A1 | 12/2012 |

OTHER PUBLICATIONS

Y. Kanazawa et al., "Detection of Feature Points for Computer Vision", IEICE Journal, Vo. 87, No. 12, pp. 1043-1048, Dec. 2004 (Abstract only).

R.I. Hartley, "A linear method for reconstruction from lines and points", Proc. 5th International Conference on Computer Vision, Cambridge, MA, pp. 882-887 (1995).

\* cited by examiner

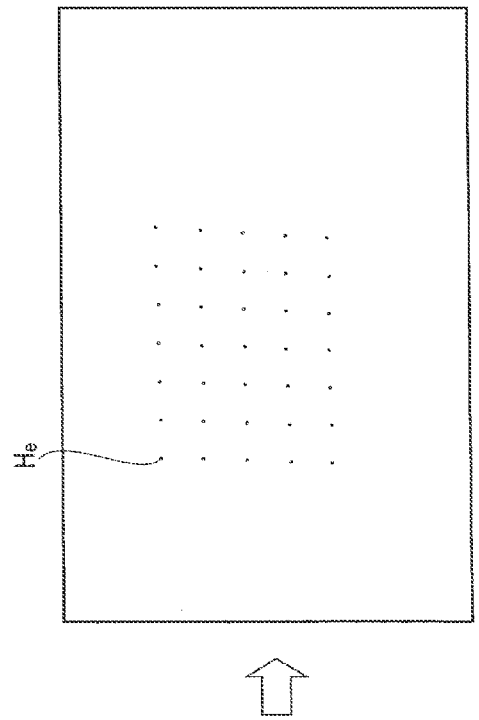
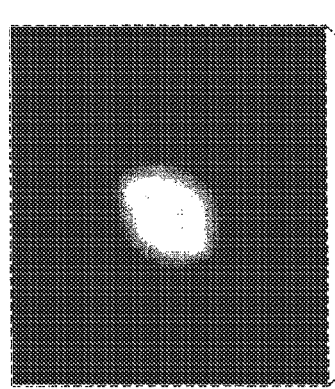
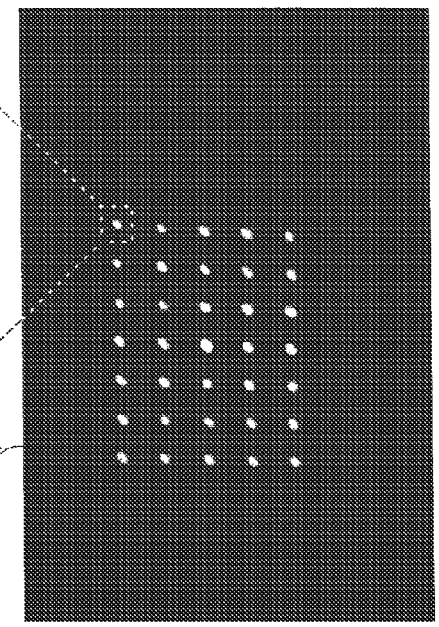
FIG. 4A
FIG. 4B
FIG. 4C

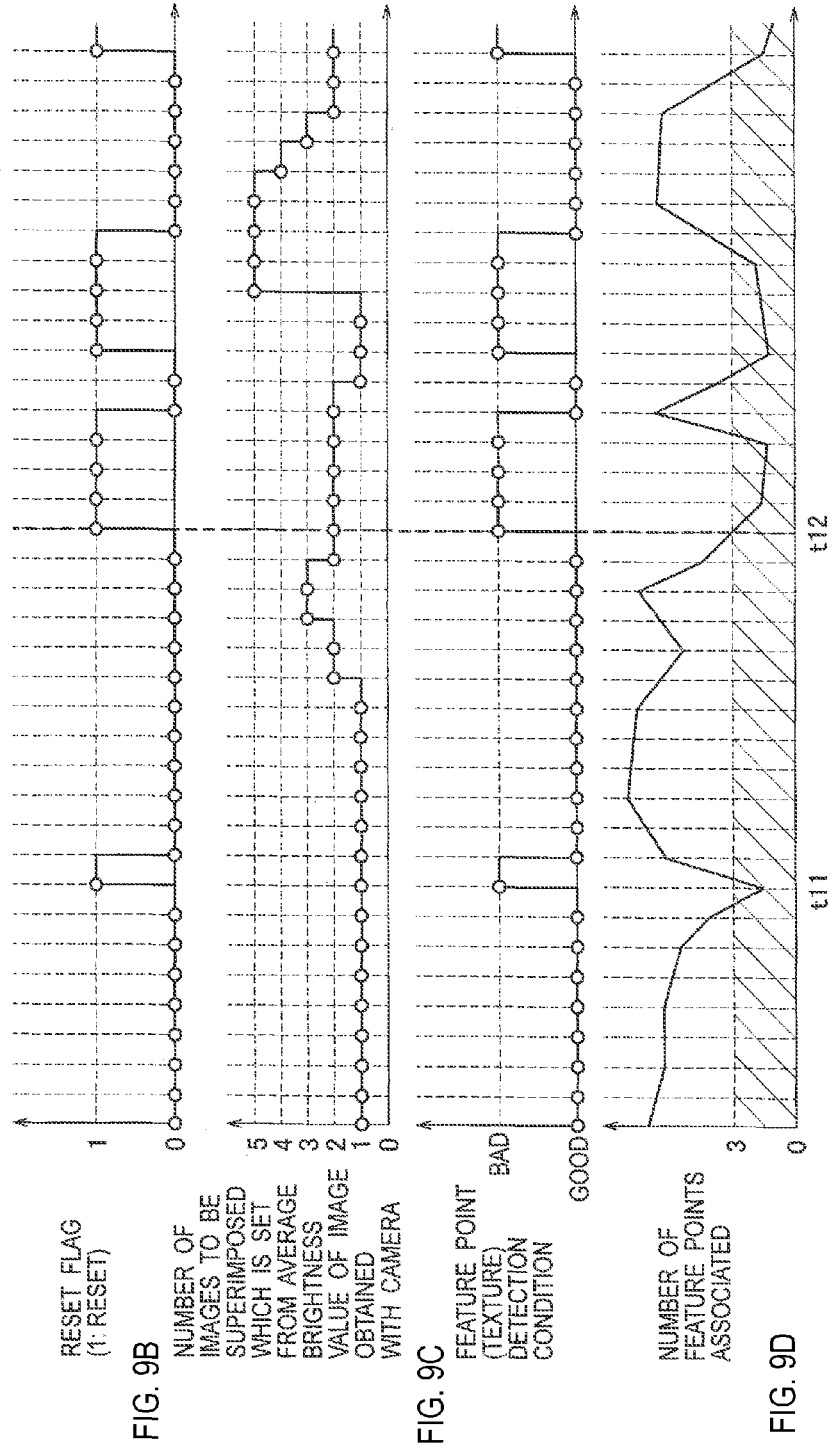

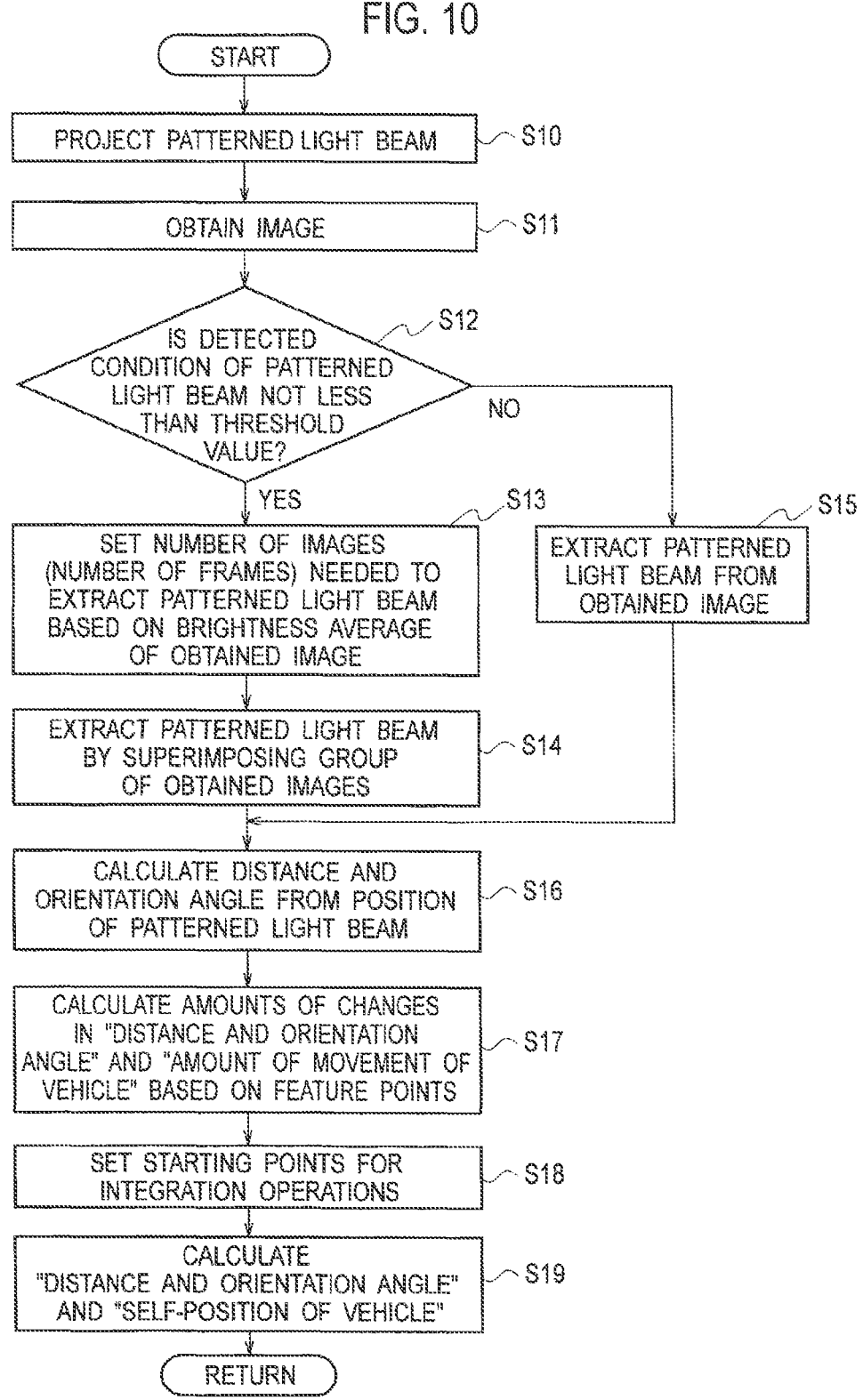

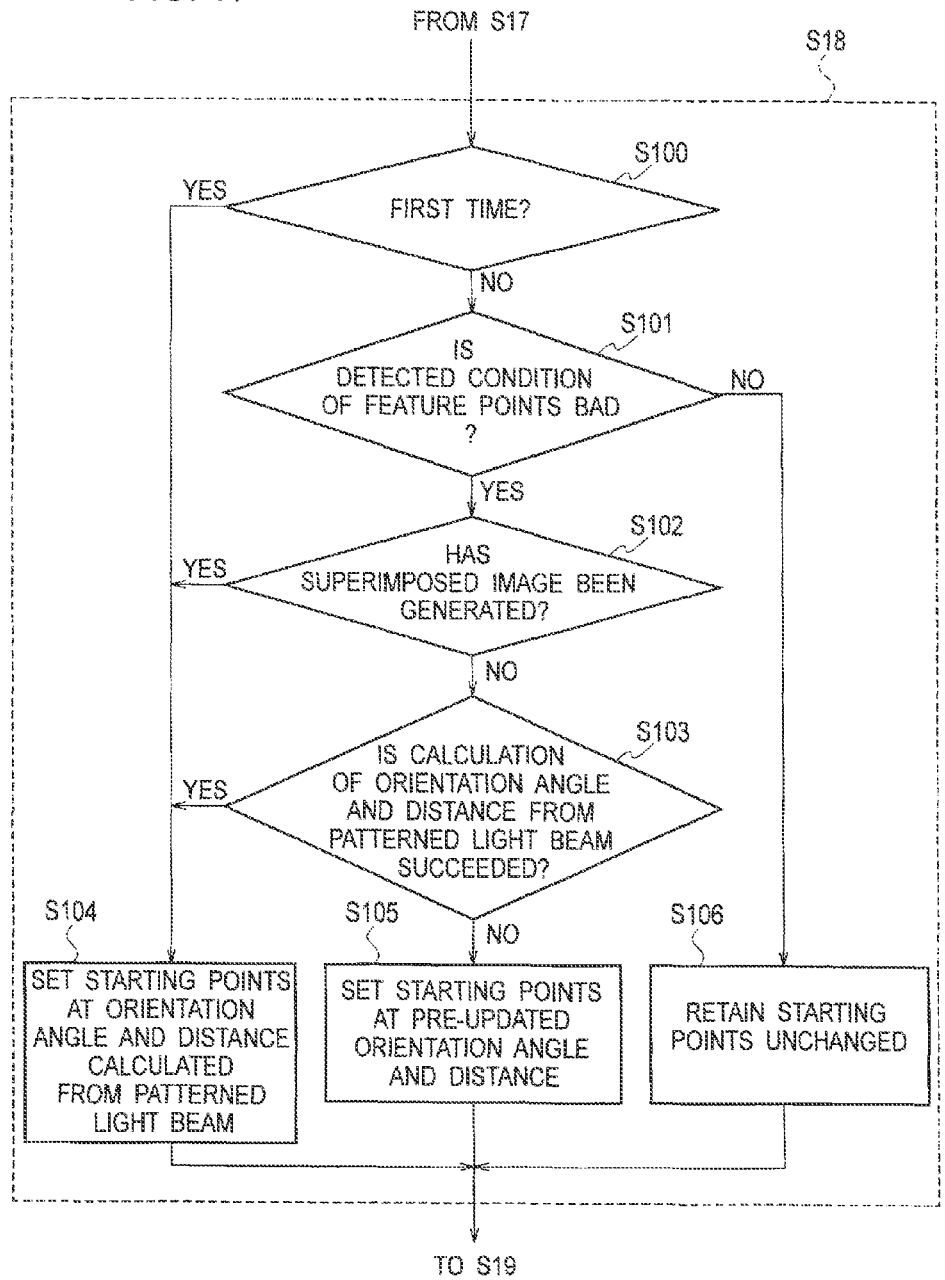

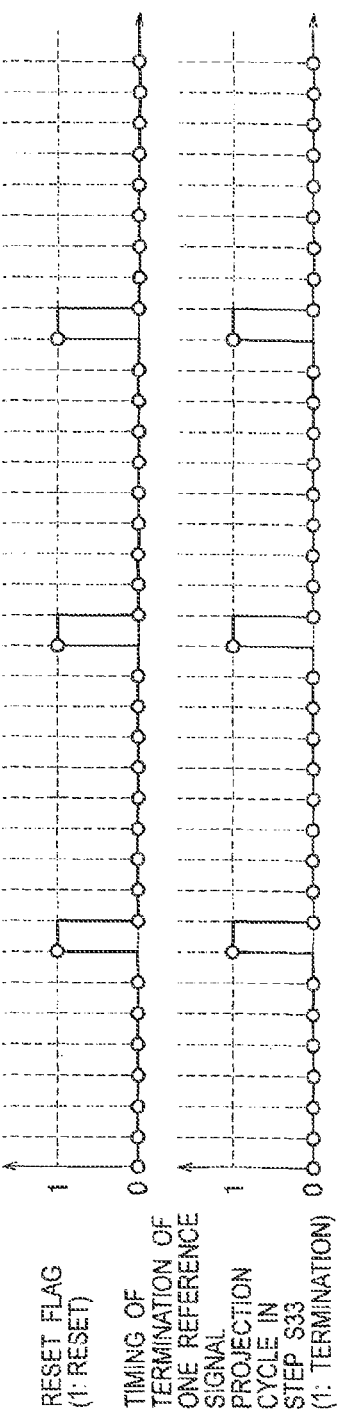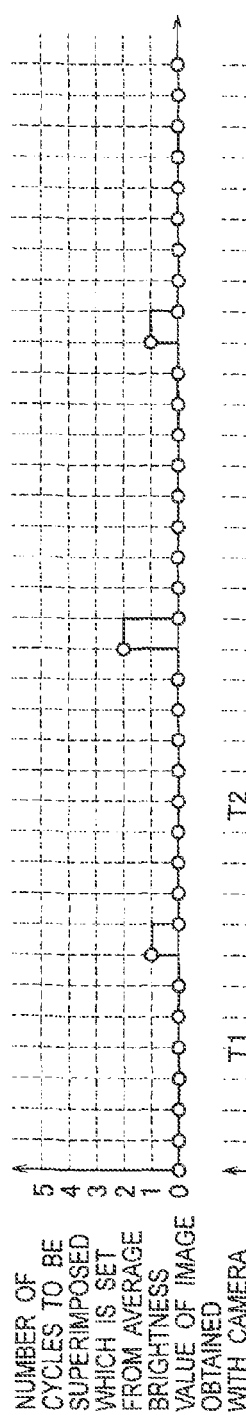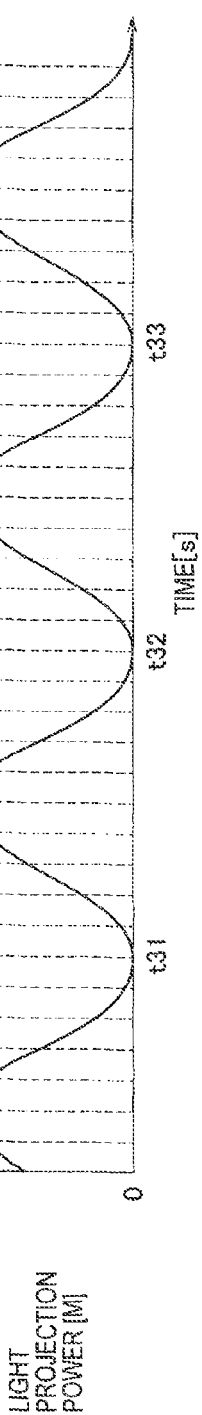

SELF-POSITION CALCULATING APPARATUS AND SELF-POSITION CALCULATING METHOD

TECHNICAL FIELD

The present invention relates to a self-position calculating apparatus and a self-position calculating method.

BACKGROUND

A technique has been conventionally known in which: cameras installed in a vehicle capture and obtain images of surroundings of the vehicle; and an amount of movement of the vehicle is obtained based on changes in the images (see Japanese Patent Application Publication No. 2008-175717, for example). Japanese Patent Application Publication No. 2008-175717 aims at obtaining the amount of movement of the vehicle accurately even if the vehicle moves slightly at slow-speed. To this end, a feature point is detected from each image; the position of the feature point is obtained; and thereby, the amount of movement of the vehicle is obtained from the direction and distance of movement (amount of movement) of the feature point.

In addition, a technique of performing a three-dimensional measurement using a laser beam projector for projecting a laser beam in a grid pattern (patterned light beam) has been known (see Japanese Patent Application Publication No. 2007-278951, for example). According to Japanese Patent Application Publication No. 2007-278951, an image of an area of the projected patterned light beam is captured with a camera; the patterned light beam is extracted from the captured image; and a behavior of the vehicle is obtained from the position of the patterned light beam.

In an outdoor environment, however, when a patterned light beam is projected onto a road surface as described in Japanese Patent Application Publication No. 2007-278951, the patterned light beam is influenced by ambient light. For this reason, it is difficult to detect the patterned light beam projected onto the road surface.

SUMMARY

The present invention has been made with the above-mentioned problem taken into consideration. An object of the present invention is to provide a self-position calculating apparatus and a self-position calculating method which are capable of: accurately detecting a patterned light beam projected onto a road surface; and accurately calculating a self-position of a vehicle.

A self-position calculating apparatus according to an aspect of the present invention calculates a current position and a current orientation angle of a vehicle by: projecting a patterned light beam onto a road surface around the vehicle from a light projector; obtaining an image of the road surface around the vehicle, including an area onto which the patterned light beam is projected, with an image capturing unit; extracting a position of the patterned light beam from the image obtained with the image capturing unit; calculating an orientation angle of the vehicle relative to the road surface from the extracted position of the patterned light beam; calculating an amount of change in orientation of the vehicle based on temporal changes in multiple feature points on the road surface on the image obtained with the image capturing unit; and adding the amount of change in the orientation to an initial position and an initial orientation angle of the vehicle. Furthermore, if a detected condition of the patterned light beam is equal to or greater than a threshold value when the position of the patterned light beam is extracted, a superimposed image is generated by superimposing images in frames obtained with the image capturing unit, and the position of the patterned light beam is extracted from the superimposed image.

BRIEF DESCRIPTION OF THE DRAWINGS

FIG. 3($b$) is a schematic diagram showing how a movement direction of the camera 12 is obtained from temporal changes in a feature point detected from an area 33 different from an area onto which a patterned light beam 32$a$ is projected;

FIGS. 4($a$) and 4($b$) are a diagram showing an image of the patterned light beam 32$a$ obtained with the camera 12, and subjected to a binarization process;

FIG. 4($a$) is a diagram showing the entirety of the patterned light beam 32$a$;

FIG. 4($b$) is a magnified diagram showing one spotlight $S_p$;

FIG. 4($c$) is a diagram showing center-of-gravity positions He of the respective spotlights $S_p$ extracted by a patterned light beam extractor 21;

FIG. 6($b$) shows a second frame 38' obtained at time (t+Δt) which is a time length Δt past time t;

FIG. 7($b$) shows how to generate the superimposed image when the external environment is bright;

FIG. 8($b$) shows how to generate the superimposed image when the external environment is dark;

FIGS. 9($a$) to 9($d$) are timing charts respectively showing a change in a reset flag, a change in the number of images to be superimposed, a change in a condition under which the feature points are detected, and a change in the number of feature points associated, in the self-position calculating apparatus of the first embodiment;

FIG. 10 is a flowchart showing an example of a self-position calculating method using the self-position calculating apparatus shown in FIG. 1;

FIG. 11 is a flowchart showing a detailed procedure for step S18 shown in FIG. 10;

FIGS. 20(a) to 20(d) are timing charts respectively showing a change in a reset flag, a change in timing of termination of each cycle, a change in the number of frequencies to be superimposed, and a change in light projection power in the self-position calculating apparatus of the third embodiment.

DETAILED DESCRIPTION OF THE EMBODIMENTS

Figure 1:
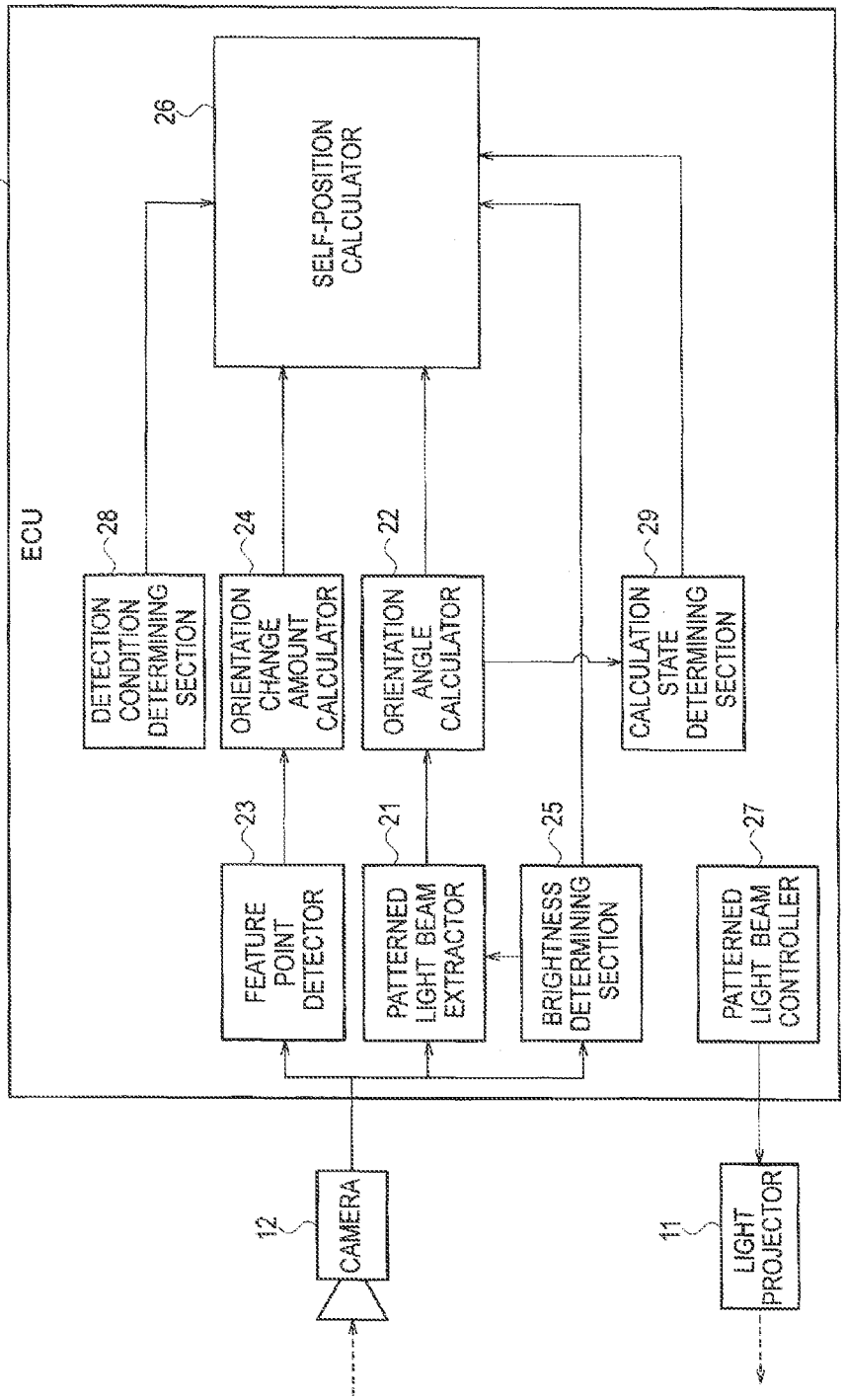
FIG. 1 is a block diagram showing an overall configuration of a self-position calculating apparatus of a first embodiment.

Referring to the drawings, descriptions will be provided for first to third embodiments. In the descriptions of the drawings, the same components will be denoted by the same reference signs. Descriptions for such components will be omitted.

[First Embodiment]
[Hardware Configuration]

To begin with, referring to FIG. 1, descriptions will be provided for a hardware configuration of a self-position calculating apparatus of a first embodiment. The self-position calculating apparatus includes a light projector 11, a camera 12 and an engine control unit (ECU) 13. The light projector 11 is installed in a vehicle, and projects a patterned light beam onto a road surface around the vehicle. The camera 12 is installed in the vehicle, and is an example of an image capturing unit configured to capture and thus obtain images of the road surface around the vehicle, inclusive of an area of the projected patterned light beam. The ECU 13 is an example of a controller configured to control the light projector 11, and to perform a series of information process cycles for estimating the amount of movement of the vehicle from images obtained with the camera 12.

Figure 2:
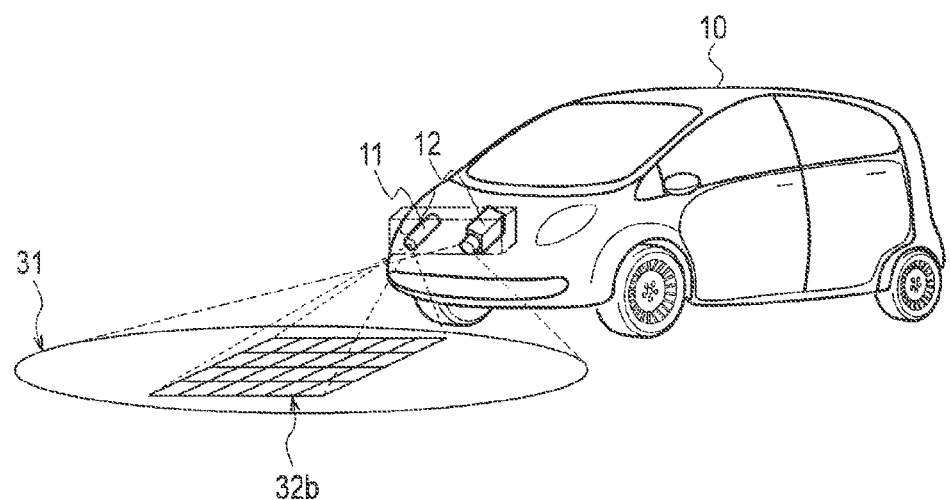
FIG. 2 is an external view showing an example of how a light projector 11 and a camera 12 are installed in a vehicle 10.

The camera 12 is a digital camera using a solid-state image sensor such as a CCD and a CMOS, and obtains processable digital images. What the camera 12 captures is the road surface around the vehicle. The road surface around the vehicle includes road surfaces in front of, in the back of, at sides of, and beneath the vehicle. As shown in FIG. 2, the camera 12 may be installed in a front section of the vehicle 10, more specifically above a front bumper, for example.

The height at and direction in which to set the camera 12 are adjusted in a way that enables the camera 12 to capture images of feature points (textures) on the road surface 31 in front of the vehicle 10 and the patterned light beam 32b projected from the light projector 11. The focus and diaphragm of the lens of the camera 12 are automatically adjusted as well. The camera 12 repeatedly captures images at predetermined time intervals, and thereby obtains a series of image (frame) groups. Image data obtained with the camera 12 is transferred to the ECU 13, and is stored in a memory included in the ECU 13.

As shown in FIG. 2, the light projector 11 projects the patterned light beam 32b having a predetermined shape, inclusive of a square or rectangular grid shape, onto the road surface 31 within an image capturing range of the camera 12. The camera 12 captures images of the patterned light beam projected onto the road surface 31. The light projector 11 includes a laser pointer and a diffraction grating, for example. The diffraction grating diffracts the laser beam projected from the pointer. Thereby, as shown in FIGS. 2 to 4, the light projector 11 generates the patterned light beam (32b, 32a) which includes multiple spotlights $S_p$ arranged in a grid or matrix pattern. In examples shown in FIGS. 3 and 4, the light projector 11 generates the patterned light beam 32a including 5×7 spotlights $S_p$.

Returning to FIG. 1, the ECU 13 includes a CPU, a memory, and a microcontroller including an input-output section. By executing pre-installed computer programs, the ECU 13 forms multiple information processors included in the self-position calculating apparatus. For each image (frame), the ECU 13 repeatedly performs the series of information process cycles for calculating the self-position of the vehicle from images obtained with the camera 12. Incidentally, the ECU 13 may be also used as an ECU for controlling other systems related to the vehicle 10.

The multiple information processors include a patterned light beam extractor (superimposed image generator) 21, an orientation angle calculator 22, a feature point detector 23, an orientation change amount calculator 24, a brightness determining section (patterned light beam detection condition determining section) 25, a self-position calculator 26, a patterned light beam controller 27, a detection condition determining section 28, and a calculation state determining section 29. The feature point detector 23 may be included in the orientation change amount calculator 24.

The patterned light beam extractor 21 reads an image obtained with the camera 12 from the memory, and extracts the position of the patterned light beam from the image. For example, as shown in FIG. 3(a), the light projector 11 projects the patterned light beam 32a, which includes the multiple spotlights arranged in a matrix pattern, onto the road surface 31, while the camera 12 detects the patterned light beam 32a reflected off the road surface 31. The patterned light beam extractor 21 applies a binarization process to the image obtained with the camera 12, and thereby extracts only an image of the spotlights $S_p$, as shown in FIGS. 4(a) and 4(b). As shown in FIG. 4(c), the patterned light beam extractor 21 extracts the position of the patterned light beam 32a by calculating the center-of-gravity position $H_e$ of each spotlight $S_p$, that is to say, the coordinates $(U_j, V_j)$ of each spotlight $S_p$ on the image. The coordinates are expressed using the number assigned to a corresponding pixel in the image sensor of the camera 12. In a case where the patterned light beam includes 5×7 spotlights $S_p$, "j" is an integer not less than 1 but not greater than 35. The memory stores the coordinates $(U_j, V_j)$ of the spotlight $S_p$ on the image as data on the position of the patterned light beam 32a.

The orientation angle calculator 22 reads the data on the position of the patterned light beam 32a from the memory, and calculates the distance and orientation angle of the vehicle 10 relative to the road surface 31 from the position of the patterned light beam 32a on the image obtained with the camera 12. For example, as shown in FIG. 3(a), using the trigonometrical measurement principle, the orientation angle calculator 22 calculates the position of each spotlit area on the road surface 31, as the position of each spotlit area relative to the camera 12, from a base length Lb between the light projector 11 and the camera 12, as well as the coordinates $(U_j, V_j)$ of each spotlight on the image. Thereafter, the orientation angle calculator 22 calculates a plane equation of the road surface 31 onto which the patterned light beam 32a is projected, that is to say, the distance and orientation angle (normal vector) of the camera 12 relative to the road surface 31, from the position of each spotlight relative to the camera 12. It should be noted that in the embodiment, the distance and orientation angle of the camera 12 relative to the road surface 31 are calculated as an example of the distance and orientation angle of the vehicle 10 relative to the road surface 31 since the position of installation of the camera 12 in the vehicle 10 and the angle for the camera 12 to capture images are already known. Hereinafter, the distance and orientation angle of the camera 12 relative to the road surface 31 will be shortened to "distance and orientation angle." The distance and orientation angle calculated by the orientation angle calculator 22 are stored into the memory.

To put it specifically, since the camera 12 and the light projector 11 are fixed to the vehicle 10, the direction in which to project the patterned light beam 32a and the distance (the base length Lb) between the camera 12 and the light projector 11 are already known. For this reason, using the trigonometrical measurement principle, the orientation angle calculator 22 is capable of obtaining the position of each spotlit area on the road surface 31, as the position $(X_j, Y_j, Z_j)$ of each spotlit area relative to the camera 12, from the coordinates $(U_j, V_j)$ of each spotlight on the image.

It should be noted that, in many cases, the position $(X_j, Y_j, Z_j)$ of each spotlight relative to the camera 12 is not present on the same plane. This is because the relative position of each spotlight changes according to the unevenness of the asphalt of the road surface 31. For this reason, the method of least squares may be used to obtain a plane equation which minimizes the sum of squares of distance difference of each spotlight.

The feature point detector 23 reads the image obtained with the camera 12 from the memory, and detects feature points on the road surface 31 from the image read from the memory. In order to detect the feature points on the road surface 31, the feature point detector 23 may use a method described in "D. G. Lowe, "Distinctive Image Features from Scale-Invariant Keypoints," Int. J. Comput. V,s., vol. 60, no. 2, pp. 91-110, November 200." Otherwise, a method described in "Kanazawa Yasushi, Kanatani Kenichi, "Detection of Feature Points for Computer V,sion," IEICE Journal, vol. 87, no. 12, pp. 1043-1048, December 2004" may be used.

Figure 6A:
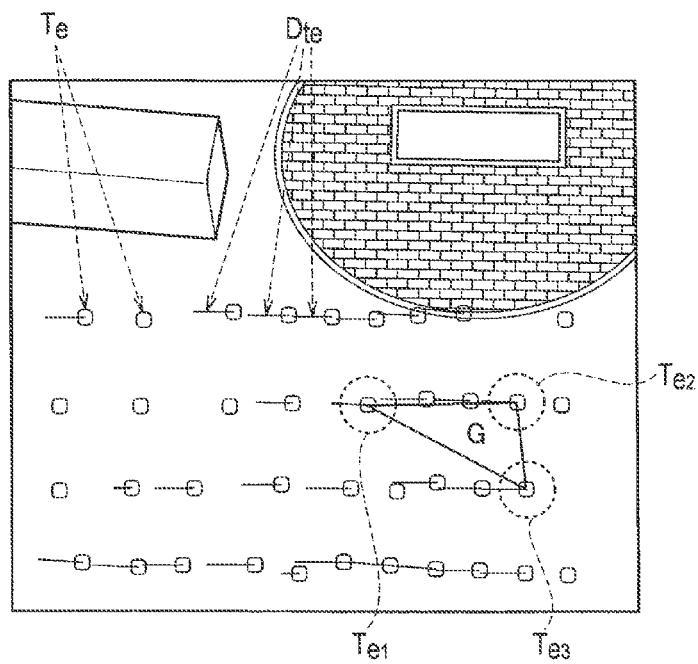
FIG. 6($a$) shows an example of a first frame (image) 38 obtained at time t.
Figure 6B:
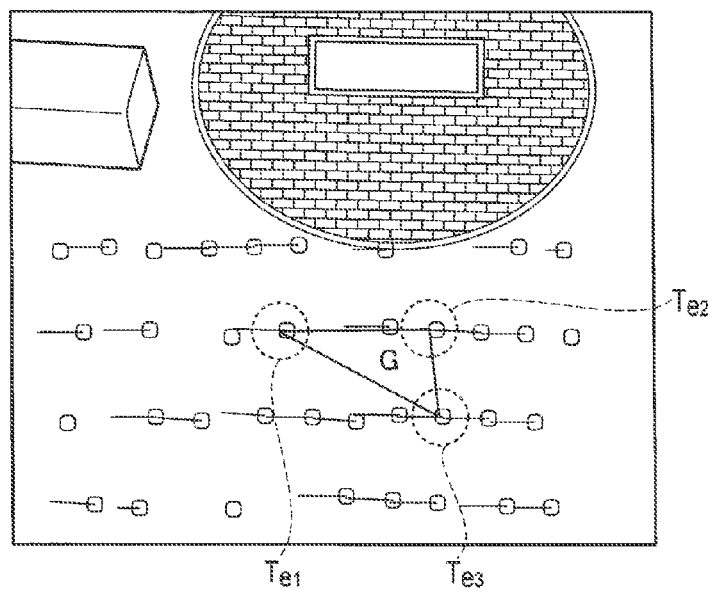

To put it specifically, for example, the feature point detector 23 uses the Harris operator or the SUSAN operator as that points, such as apexes of an object, the luminance values of which are largely different from those of the vicinities of the points are detected as the feature points. Instead, however, the feature point detector 23 may use a SIFT (Scale-Invariant Feature Transform) feature amount so that points around which the luminance values change with certain regularity are detected as the feature points. After detecting the feature points, the feature point detector 23 counts the total number N of feature points detected from one image, and assigns identification numbers (i $(1 \leq i \leq N)$) to the respective feature points. The position $(U_i, V_i)$ of each feature point on the image is stored in the memory inside the ECU 13. FIGS. 6(a) and 6(b) each shows examples of the feature points $T_e$ which are detected from the image obtained with the camera 12. The position $(U_i, V_i)$ of each feature point on the image is stored into the memory.

It should be noted that the present embodiment treats particles of asphalt mixture with a particle size of not less than 1 cm but not greater than 2 cm as the feature points on the road surface 31. The camera 12 employs the VGA resolution mode (approximate 300 thousand pixels) in order to detect the feature points. In addition, the distance from the camera 12 to the road surface 31 is approximately 70 cm. Moreover, the direction in which the camera 12 captures images is tilted at approximately 45 degrees to the road surface 31 from the horizontal plane. What is more, the luminance value of each image obtained with the camera 12 and thereafter sent to the ECU 13 is within a range of 0 to 255 (0: darkest, 255: brightest).

The orientation change amount calculator 24 selects a previous frame and a current frame from frames captured in cycles of the information process; and reads the positions $(U_i, V_i)$ of multiple feature points on an image in the previous frame, and the positions $(U_i, V_i)$ of multiple feature points on an image in the current frame, from the memory. Thereafter, based on changes in the positions of the multiple feature points on the image, the orientation change amount calculator 24 obtains an amount of change in the orientation of the vehicle. In this respect, the "amount of change in the orientation of the vehicle" includes both amounts of changes in the "distance and orientation angle" relative to the road surface 31, and an "amount of movement of the vehicle (the camera 12)" on the road surface. Descriptions will be hereinafter provided for how to calculate the amounts of changes in the distance and orientation angle and the amount of movement of the vehicle.

Figure 5:
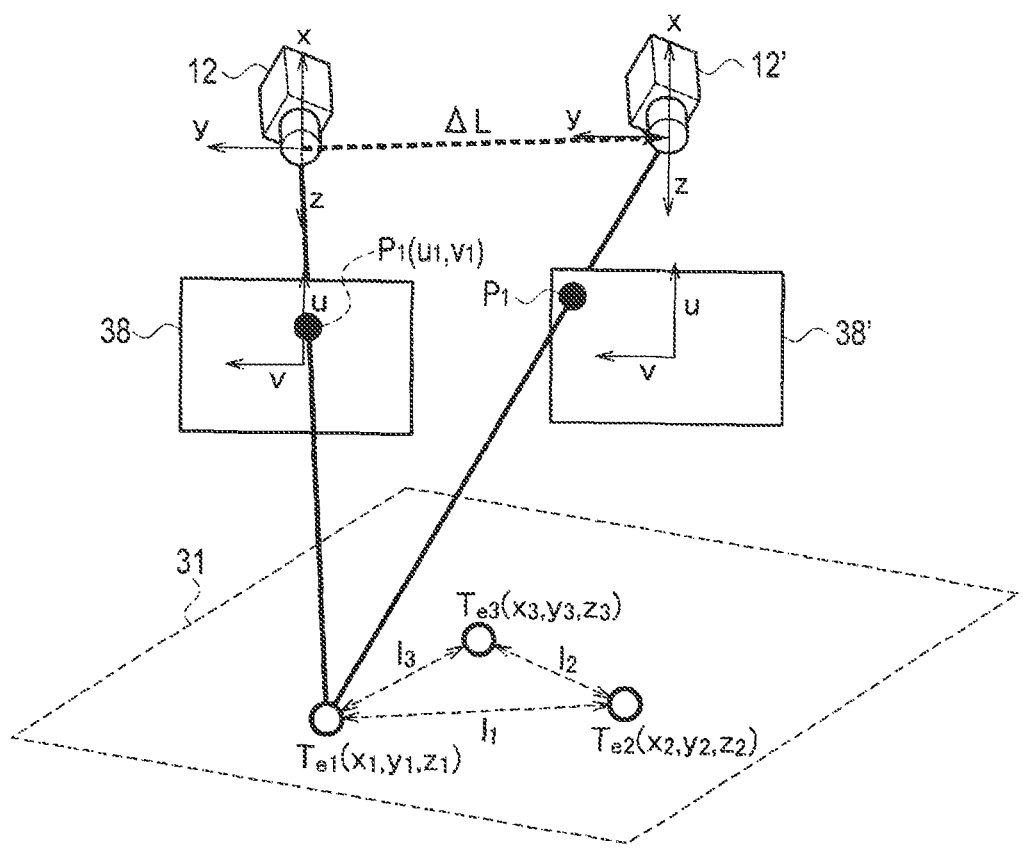
FIG. 5 is a schematic diagram for explaining a method of calculating an amount of change in a distance and an amount of change in an orientation angle.

FIG. 6(a) shows an example of a first frame (image) 38 obtained at time t. Let us assume a case where as shown in FIGS. 5 and 6(a), relative positions $(X_i, Y_i, Z_i)$ of three feature points $T_{e1}, T_{e2}, T_{e3}$ are calculated on the first frame 38, for example. In this case, a plane G defined by the feature points $T_{e1}, T_{e2}, T_{e3}$ can be regarded as the road surface. Accordingly, the orientation change amount calculator 24 is capable of obtaining the distance and orientation angle (normal vector) of the camera 12 relative to the road surface (the plane G), from the relative positions $(X_i, Y_i, Z_i)$. Furthermore, using already-known camera models, the orientation change amount calculator 24 is capable of obtaining a distance $l_1$ between the feature points $T_{e1}, T_{e2}$, a distance $l_2$ between the feature points $T_{e2}, T_{e3}$ and a distance $l_3$ between the feature points $T_{e3}, T_{e1}$, as well as an angle between a straight line joining the feature points $T_{e1}, T_{e2}$ and a straight line joining the feature points $T_{e2}, T_{e3}$, an angle between the straight line joining the feature points $T_{e2}, T_{e3}$ and a straight line joining the feature points $T_{e3}, T_{e1}$, and an angle between the straight line joining the feature points $T_{e3}, T_{e1}$ and the straight line joining the feature points $T_{e1}, T_{e2}$.

The camera 12 in FIG. 5 shows where the camera is located when the camera takes the first frame.

It should be noted that the three-dimensional coordinates $(X_i, Y_i, Z_i)$ of the relative position relative to the camera 12 are set in a way that: the Z-axis coincides with the direction in which the camera 12 captures the image; and the X and Y axes orthogonal to each other in a plane including the camera 12 are lines normal to the direction in which the camera 12 captures the image. Meanwhile, the coordinates on the image 38 are set such that: the V-axis coincides with the horizontal direction; and the U-axis coincides with the vertical direction.

FIG. 6(b) shows a second frame obtained at time (t+Δt) where the time length Δt passed from time t. A camera 12' in FIG. 5 shows where the camera is located when camera captures the second frame 38'. As shown in FIGS. 5 and 6(b), the camera 12' captures an image including the feature points $T_{e1}$, $T_{e2}$, $T_{e3}$ as the second frame 38', and the feature point detector 23 detects the feature points $T_{e1}$, $T_{e2}$, $T_{e3}$ from the image. In this case, the orientation change amount calculator 24 is capable of calculating not only an amount ΔL of movement of the camera 12 in the interval of time Δt but also amounts of changes in distance and orientation angle from: the relative position $(X_i, Y_i, Z_i)$ of each of the feature points $T_{e1}$, $T_{e2}$, $T_{e3}$ at time t; a position $P_1$ $(U_i, V_i)$ of each feature point on the second frame 38'; and the camera model of the camera 12. For example, the orientation change amount calculator 24 is capable of calculating the amount (ΔL) of movement of the camera 12 (the vehicle), and the amounts of changes in the distance and orientation angle of the camera 12 (the vehicle) by solving the following system of simultaneous equations (1) to (4). Incidentally, Equation (1) is based on the camera 12 that is modeled as an ideal pinhole camera free from strain and optical axial misalignment where λi and f respectively denote a constant and a focal length. The parameters of the camera model may be calibrated in advance.

[Equation (1)]

$$\lambda_i \begin{bmatrix} u_i \\ v_i \\ 1 \end{bmatrix} = \begin{bmatrix} f & 0 & 0 \\ 0 & f & 0 \\ 0 & 0 & 1 \end{bmatrix} \begin{bmatrix} x_i \\ y_i \\ z_i \end{bmatrix} \quad (1)$$

[Equation (2)]

$$(x_1 - x_2)^2 + (y_1 - y_2)^2 + (z_1 - z_2)^2 = l_1^2 \quad (2)$$

[Equation (3)]

$$(x_3 - x_2)^2 + (y_3 - y_2)^2 + (z_3 - z_2)^2 = l_2^2 \quad (3)$$

[Equation (4)]

$$(x_1 - x_3)^2 + (y_1 - y_3)^2 + (z_1 + z_3)^2 = l_3^2 \quad (4)$$

Figure 3B:
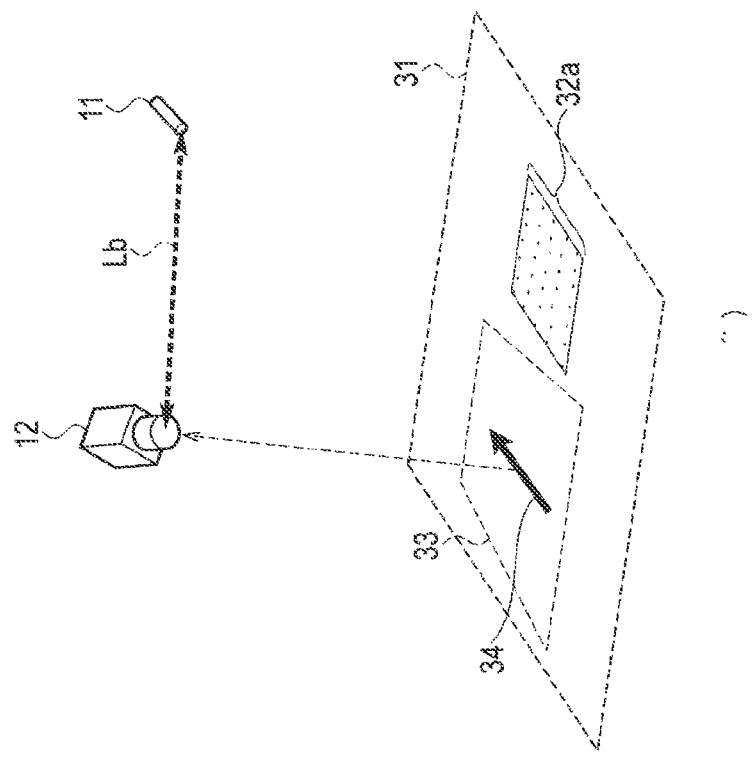
FIG. 3($a$) is a diagram showing how positions of spotlit areas on a road surface 31 are calculated using a base length Lb between the light projector 11 and the camera 12, as well as coordinates $(U_j, V_j)$ of the spotlights on an image.
Figure 3A:
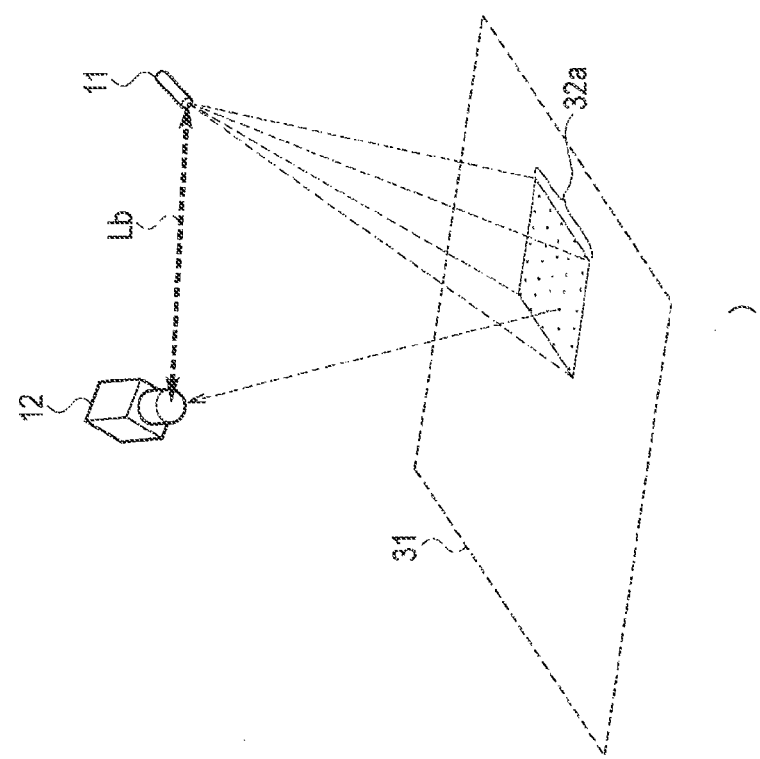

FIG. 3(b) schematically shows how a movement direction 34 of the camera 12 is obtained from temporal changes in a feature point detected from an area 33 in an image capturing range of the camera 12, which is different from an area onto which the patterned light beam 32a is projected. FIGS. 6(a) and 6(b) show vectors $D_{te}$ which respectively represent the directions and amounts of changes in the positions of the feature points $T_e$, and which are superposed on an image. The orientation change amount calculator 24 is capable of calculating not only the amount (ΔL) of movement of the camera 12 in a time length Δt but also the amounts of changes in the distance and orientation angle of the camera 12 at the same time. For these reasons, with the amounts of changes in the distance and orientation angle taken into consideration, the orientation change amount calculator 24 is capable of accurately calculating the amount (ΔL) of movement in six degrees of freedom. In other words, an error in estimating the amount (ΔL) of movement can be minimized even if the distance and orientation angle are changed by the roll or pitch due to a turn, acceleration or deceleration of the vehicle 10.

It should be noted that instead of using all the feature points whose relative positions are calculated, the orientation change amount calculator 24 may select optimum feature points based on positional relationships among the feature points. An example of a selection method usable for this purpose is the epipolar geometry (the epipolar line geometry described in R. I. Hartley, "A linear method for reconstruction from lines and points," Proc. 5th International Conference on Computer Vision, Cambridge, Mass., pp. 882-887 (1995)).

The associating of the feature points in the current frame with the feature points in the previous frame may be achieved, for example, by: storing an image of a small area including and around each detected feature point into the memory; and determining whether the feature points in the current frame and the feature points in the previous frame can be associated with each other from the similarity in brightness information and color information between the feature points in the current frame and the feature points in the previous frame. To put it specifically, the ECU 13 stores a 5(horizontal)×5(vertical)-pixel image of and around each detected feature point into the memory. If in 20 or more pixels of each 5(horizontal)×5(vertical)-pixel image, for example, the difference in the brightness information between the corresponding feature point in the current frame and the corresponding feature point in the previous frame is equal to or less than 1%, the orientation change amount calculator 24 determines that the feature point in the current frame and the feature point in the previous frame can be associated with each other.

When like in this case, the feature points $T_{e1}$, $T_{e2}$, $T_{e3}$ whose relative positions $(X_i, Y_i, Z_i)$ are calculated are detected from an image 38' obtained at a subsequent timing as well, the orientation change amount calculator 24 is capable of calculating the "amount of change in the orientation of the vehicle" based on the temporal changes in the multiple feature points on the road surface.

The self-position calculator 26 calculates the distance and orientation angle from the "amounts of changes in the distance and orientation angle" calculated by the orientation change amount calculator 24. In addition, the self-position calculator 26 calculates the current position of the vehicle from the "amount of movement of the vehicle" calculated by the orientation change amount calculator 24.

To put it specifically, in a case where the distance and orientation angle calculated by the orientation angle calculator 22 (see FIG. 1) are set as starting points for the self-position calculator 26's calculation for the distance and orientation angle, the self-position calculator 26 updates the distance and orientation angle with the most recent numerical values by sequentially adding (performing an integration operation on) the amounts of changes in the distance and orientation angle calculated for each frame by the orientation change amount calculator 24 to the starting points (distance and orientation angle). In addition, in a case where the position of the vehicle which is obtained when the orientation angle calculator 22 calculates the distance and orientation angle is set as a starting point (an initial position of the vehicle) for the self-position calculator 26's calculation for the current position of the vehicle, the self-position calculator 26 calculates the current position of the vehicle by sequentially adding (performing an integration operation on) the amounts of movement of the vehicle to the initial position. For example, when the starting point (the initial position of the vehicle) is set to match the position of the vehicle on a map, the self-position calculator 26 is capable of sequentially calculating the current position of the vehicle on the map.

In a case where the feature point detector 23 can continue detecting three or more feature points which can be associated between the previous and current frames as discussed above, the continuation of the process (integration operation) of adding the amounts of changes in the distance and orientation angle enables the self-position calculator 26 to keep updating the distance and orientation angle with the most recent numerical values without using the patterned light beam 32a. Nevertheless, the distance and orientation angle calculated using the patterned light beam 32a, or a predetermined initial distance and a predetermined initial orientation angle, may be used for the first information process cycle. In other words, the distance and orientation angle which are the starting points for the integrations operation may be calculated using the patterned light beam 32a, or may be set at the predetermined initial values. It is desirable that the predetermined initial distance and the predetermined initial orientation angle are a distance and an orientation angle determined with at least occupants and payload of the vehicle 10 taken into consideration. For example, the distance and orientation angle calculated using the patterned light beam 32a which is projected while the ignition switch of the vehicle 10 is on and when the shift position is moved from the parking position to another position may be used as the predetermined initial distance and the predetermined initial orientation angle. Thereby, it is possible to obtain the distance and orientation angle which is not affected by the roll or pitch of the vehicle 10 due to the turn, acceleration or deceleration of the vehicle 10.

The embodiment updates the distance and orientation angle with the most recent numerical values by: calculating the amounts of changes in the distance and orientation angle; and sequentially adding the thus-calculated amounts of changes in the distance and orientation angle. Instead, however, the amount of a change in only the orientation angle of the camera 12 relative to the road surface 31 may be calculated and updated. In this case, it may be assumed that the distance of the camera 12 to the road surface 31 remains constant. This makes it possible to reduce the operation load on the ECU 13 while minimizing the error in estimating the amount ($\Delta L$) of movement with the amount of the change in the orientation angle taken into consideration, and to increase the operation speed of the ECU 13.

The detection condition determining section 28 determines whether or not a condition under which the feature point detector 23 detects the feature points $T_e$ is too bad to satisfy a first criterion. For example, if like a concrete pavement inside a tunnel, the road surface is less patterned and almost even with particles of asphalt mixture, the feature points detectable from an image of the road surface decreases in number. The decreased number of detectable feature points makes it difficult to continuously detect the feature points which are associated between the previous and current frames, and lowers the accuracy with which the distance and orientation angle are updated.

As a measure against this problem, the detection condition determining section 28 determines that the condition under which the feature point detector 23 detects the feature points $T_e$ is too bad to satisfy the first criterion, if for example, the number of feature points, whose positions relative to the camera 12 are calculated and can be detected from an image obtained in the subsequent information process cycle, is equal to or less than a predetermined threshold value (three, for example). In other words, if four or more feature points associated between the previous and current frames cannot be detected, the detection condition determining section 28 determines that the condition under which the feature points $T_e$ are detected is too bad to satisfy the first criterion. Incidentally, at least three feature points associated between the previous and current frames are needed to obtain the amounts of changes in the distance and orientation angle. This is because three feature points are needed to define the plane G. Since more feature points are needed to increase the estimation accuracy, it is desirable that the predetermined threshold value be at four, five or more.

If the detection condition determining section 28 determines that the condition under which the feature points are detected satisfies the first criterion, the self-position calculator 26 retains the starting points for the integration operations as they are. On the other hand, if the detection condition determining section 28 determines that the condition under which the feature points are detected is too bad to satisfy the first criterion, the self-position calculator 26 resets the starting points for the integration operations (the orientation angle and the initial position of the vehicle) at the distance and orientation angle calculated by the orientation angle calculator 22 (see FIG. 1) in the same information process cycle, and at the position of the vehicle obtained at the time of the calculation. Thereafter, the self-position calculator 26 starts to add the amount of change in the orientation of the vehicle to the thus-reset starting points.

In the first embodiment, based on the number of feature points associated between the previous and current frames, the detection condition determining section 28 determines under what condition the feature points are detected. Instead, however, it should be noted that the detection condition determining section 28 may be configured such that, based on the total number N of feature points detected from one image, the detection condition determining section 28 determines under what condition the feature points are detected. To put it specifically, the configuration may be such that if the total number N of feature points detected from one image is equal to or less than a predetermined threshold value (9, for example), the detection condition determining section 28 determines that the condition under which the feature points are detected is too bad to satisfy the first criterion. A threshold value for the total number N may be set at a numerical value (9) three times the predetermined threshold value (3) because there is likelihood that some of detected feature points cannot be associated between the previous and current frames.

The calculation state determining section 29 determines whether or not a state of calculation of the distance and orientation angle by the orientation angle calculator 22 is too bad to satisfy a second criterion. For example, in a case where the patterned light beam is projected onto a bump on the road surface 31, the accuracy of the calculation of the distance and orientation angle decreases significantly because the bump on the road surface 31 is larger than dents and projections of the asphalt pavement. If the condition under which the feature points are detected is too bad to satisfy the first criterion, and concurrently if the state of the calculation of the distance and orientation angle is too bad to satisfy the second criterion, there would otherwise be no means for accurately detecting the distance and orientation angle, as well as the amounts of changes in the distance and orientation angle.

With this taken into consideration, the calculation state determining section 29 determines that the state of the calculation of the distance and orientation angle by the orientation angle calculator 22 is too bad to satisfy the second criterion, if standard deviations of the distance and orientation angle calculated by the orientation angle calculator 22 are greater than predetermined threshold values. Furthermore, if the number of spotlights detected out of the 35 spotlights is less than three, the calculation state determining section 29 determines that the state of the calculation of the distance and orientation angle by the orientation angle calculator 22 is too bad to satisfy the second criterion, since theoretically, the plane equation of the road surface 31 cannot be obtained from such a small number of detected spotlights. In a case where the plane equation is obtained using the method of least square, if an absolute value of the maximum value among the differences between the spotlights and the plane obtained by the plane equation is equal to or greater than a certain threshold value (0.05 m, for example), the calculation state determining section 29 may determine that the state of the calculation of the distance and orientation angle by the orientation angle calculator 22 is too bad to satisfy the second criterion.

If the detection condition determining section 28 determines that the condition under which the feature points are detected is too bad to satisfy the first criterion, and concurrently if the calculation state determining section 29 determines that the state of the calculation of the distance and orientation angle by the orientation angle calculator 22 is too bad to satisfy the second criterion, the self-position calculator 26 uses the distance and orientation angle obtained in the previous information process cycle, as well as the current position of the vehicle, as the starting points for the integration operations. This makes it possible to minimize an error in calculating the amount of movement of the vehicle.

The patterned light beam controller 27 controls the projection of the patterned light beam 32$a$ by the light projector 11. For example, after the ignition switch of the vehicle 10 is turned on, once the self-position calculating apparatus becomes activated, the patterned light beam controller 27 starts to project the patterned light beam 32$a$. Thereafter, until the self-position calculating apparatus stops its operation, the patterned light beam controller 27 continues projecting the patterned light beam 32$a$. Otherwise, the patterned light beam controller 27 may be configured to alternately turn on and off the light projection in predetermined intervals. Instead, the patterned light beam controller 27 may be configured to temporarily project the patterned light beam 32$a$ only when the detection condition determining section 28 determines that the condition under which the feature points $T_e$ are detected is too bad to satisfy the first criterion.

The brightness determining section (patterned light beam detection condition determining section) 25 determines whether or not a detected condition of the patterned light beam obtained with the camera 12 is equal to or greater than a predetermined threshold value. For example, the brightness determining section 25 determines whether or not the brightness average value (the detected condition of the patterned light beam) of an image obtained with the camera 12 is equal to or greater than a road surface brightness threshold value Bth (predetermined threshold value). Incidentally, the brightness determining section 25 may determine whether or not illuminance on an image obtained with the camera 12 is equal to or greater than a threshold value. Furthermore, instead of the brightness determining section 25, a luminance sensor may be installed in the vehicle.

The road surface brightness threshold value Bth can be beforehand obtained using the following procedure, for example. First of all, after the vehicle is put into an empty state with no person, luggage, fuel, etc. in the vehicle, an image of an asphalt paved road surface is captured with the camera 12 by projecting a patterned light beam onto the road surface. In this case, arrangements are made so that the brightness of the asphalt paved road surface on the image may be substantially even. For example, the image of the road surface is captured with the light environment adjusted such that 95% of the pixels representing no patterned light beam have brightness within 20 scale points of the brightness average value. Incidentally, the representations assume that the brightness values of the images obtained with the camera 12 are within a range of 0 to 255 (where 0 represents the darkest brightness, and 255 represents the brightest brightness). After that, in the obtained image, a brightness average value Bp of the pixels representing the patterned light beam and a brightness average value Ba of the pixels representing the asphalt paved road surface other than the patterned light beam are compared with each other. This process series is repeated at first using the brightness average value Ba of the pixels representing the asphalt paved road surface, and subsequently using values obtained by adding 10 scale points to the brightness average value Ba each time the process series is repeated. The brightness threshold value Bth is defined as the thus-increased brightness average value Ba which satisfies Bp×0.7<Ba. In other words, the brightness threshold value Bth is defined as a value of the brightness of the asphalt paved road surface which is approximately 30% of the brightness of the patterned light beam.

When the brightness determining section 25 determines that the detected condition of the patterned light beam is equal to or greater than the predetermined threshold value, the patterned light beam extractor 21 superimposes a predetermined number of images in the successive frames selected from the images obtained with the camera 12. Incidentally, the following descriptions will be provided on an assumption that images in the successive frames stored in the memory between the past and present are used as the images to be superimposed. Nevertheless, the images to be superimposed may include images which the camera 12 will take between the present and future. Thereafter, the patterned light beam extractor 21 extracts the position of the patterned light beam from the generated superimposed image. The orientation angle calculator 22 can calculate the orientation angle of the vehicle relative to the road surface using the position of the patterned light beam extracted from the superimposed image. Meanwhile, the self-position calculator 26 can start to add the amount of change in the orientation by setting the initial position and orientation angle of the vehicle (the stating points), respectively, at the current position of the vehicle at this moment and the orientation angle of the vehicle calculated from the superimposed image.

In this respect, the patterned light beam extractor 21 sets the predetermined number of the images to be superimposed, depending on the detected condition of the patterned light beam on the image obtained with the camera 12. The detected condition of the patterned light beam can be represented by a ratio (S/N ratio) of the brightness value of the patterned light beam to the brightness value of the ambient light, for example. The patterned light beam extractor 21 increases the number of images to be superimposed as the S/N ratio becomes smaller (as the external environment becomes brighter).

Figure 7A:
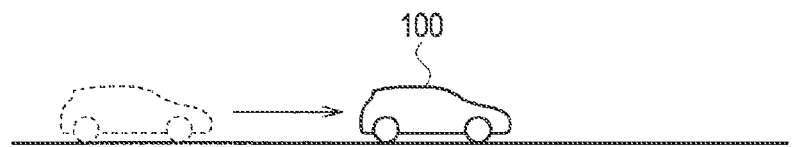
FIG. 7($a$) shows an amount of movement of the vehicle which is needed to generate a superimposed image when an external environment is bright.
Figure 7B:
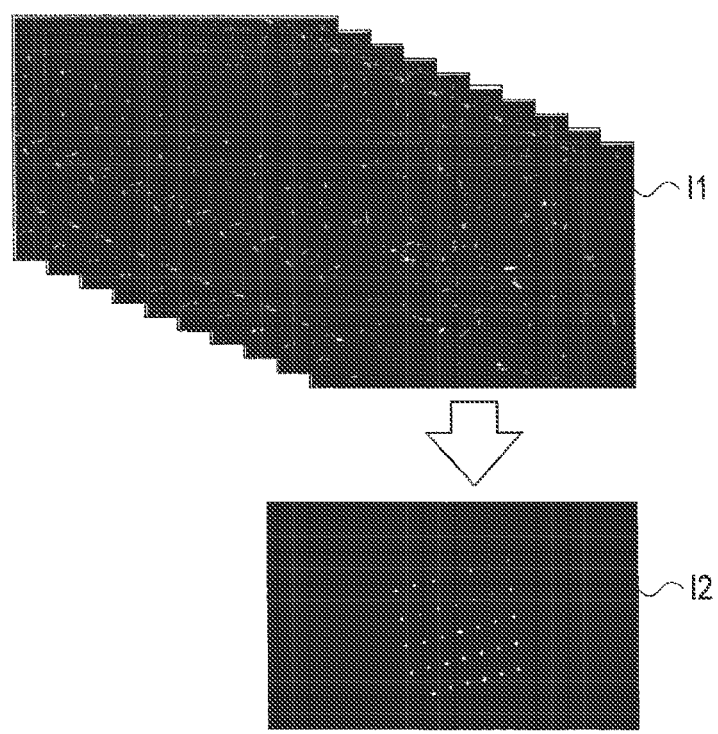
Figure 8A:
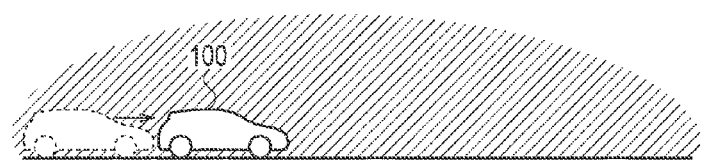
FIG. 8($a$) shows an amount of movement of the vehicle which is needed to generate a superimposed image when the external environment is dark.
Figure 8B:
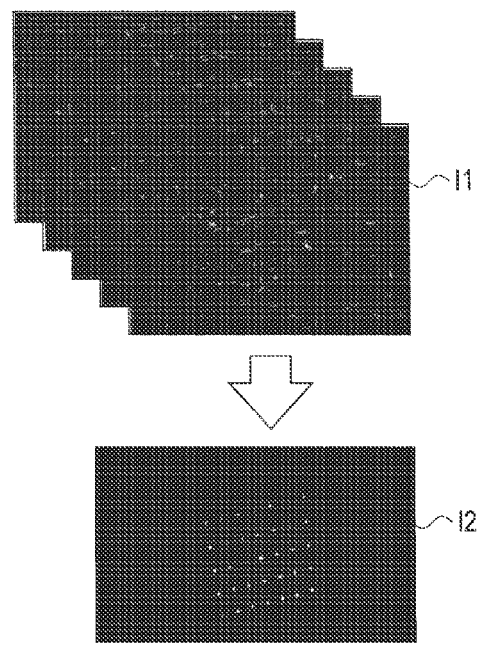

As shown in FIG. 7(a), because a relatively large number of images are needed in a relatively bright external environment, an amount of movement of the vehicle needed to obtain a group of images is relatively large. Furthermore, as shown in FIG. 7(b), the relatively large number of images I1 are superimposed to generate a superimposed image I2. On the other hand, as shown in FIG. 8(a), because a relatively small number of images are needed in a relatively dark external environment, an amount of movement of the vehicle needed to obtain a group of images is relatively small. Furthermore, as shown in FIG. 8(b), the relatively small number of images I1 are superimposed to generate a superimposed image I2.

The number of images needed to be superimposed for the patterned light beam extractor 21 to extract the patterned light beam can be set using the following procedure, for example. To begin with, for each of the original brightness average value Ba of the pixels representing the asphalt paved road surface and the brightness average values Ba obtained by sequentially adding 10 scale points like when the brightness threshold value Bth is obtained, Rap=Ba/Bp, or a ratio of the brightness average value Ba to the brightness average value Bp of the pixels representing the patterned light beam is obtained through experiments or the like in advance, and is stored into the memory of the ECU. Thereafter, the actual control is performed by: rounding the brightness average value of the images obtained with the camera 12 to the nearest 10; obtaining the S/N ratio Rap using the nearest 10; obtaining Sn using Equation (5) given blow by referring to the thus-obtained S/N ratio Rap; rounding the thus-obtained Sn to the nearest whole number; and setting the number of images needed to extract the patterned light beam at the nearest whole number:

$$Sn = \max\{(0.5 \div (1-Rap)2), 50\} \quad (5).$$

In other words, when the brightness average value Ba of the asphalt paved road surface is approximately 29% or less of the brightness average value Bp of the patterned light beam, the number of images needed to extract the patterned light beam is set at 1. When the brightness average value Ba is 75% of the brightness average value Bp, the number of needed images is set at 8. When the brightness average value Ba is 90% or more of the brightness average value Bp, the number of need images is set at 50. Incidentally, since a part representing the area onto which the patterned light beam is projected is sufficiently small compared with the whole of each image, the brightness average value of the whole of the image may be calculated. Otherwise, the number of images needed may be set at a number which makes a success rate of the extraction of the spotlights of the patterned light beam certain to become 95% or greater by actually superimposing the images to extract the spotlights in an experiment for obtaining ratios Rap using the brightness average value Ba and values obtained by sequentially adding 10 scale points to the brightness average value Ba.

Meanwhile, as described below, in a case where the patterned light beam extractor 21 cannot generate (has difficulty in generating) the superimposed image, the distance and orientation angle employed for the previous information process cycle (hereinafter also referred to simply as "previous values"), or the predetermined initial distance and predetermined initial orientation angle of the vehicle (also referred to simply as "initial values") are used as the starting points.

First, there are cases where an excessively small S/N ratio (an excessive brightness) increases the time needed for the integration operation too much. For example, when the ratio Rap obtained by referring to the nearest 10 to which the brightness average value of the images obtained with the camera 12 is rounded is 0.95 or greater, or when the brightness average value of the asphalt paved road surface is 90% or more of brightness average value of the patterned light beam, too much time is needed to generate a superimposed image. In this case, it is determined that the assumption that the road surface changes slightly while a superimposed image is being generated becomes unrealistic, or that it is difficult theoretically to extract the patterned light beam. Thus, the previous values or the initial values are used as the starting points.

Second, there are cases where the vehicle behaves too much (the vehicle speed is too fast). For example, in a case where the vehicle moves a distance of more than 0.2 [m] while a set number of images to be superimposed are being captured, it is determined that: the assumption that the road surface changes slightly becomes unrealistic; and no superimposed image can be generated. In this respect, in the case where the brightness average value Ba is 75% of the brightness average value Bp, the number of images needed to be obtained with a 1000-fps camera to generate one superimposed image is 8. For this reason, if the vehicle speed is equal to or greater than 90 km/h which is obtained using Equation (6) given below, the previous values or the initial values are used as the starting points:

$$0.2[m] \div (8[\text{images}] \div 100 \,[\text{fps}]) = 25[\text{m/s}] \quad (6)$$
$$= 90[\text{km/h}].$$

Third, there are cases where the change in the road surface (bumps or unevenness) is too large. For example, it is determined whether or not the road surface condition around the vehicle changes to an extent equal to or greater than a threshold value while a set number of images to be superimposed are being captured. If more than 5% of the thus-obtained images show that the road surface condition around the vehicle changes to the extent equal to or greater than the threshold value, it is determined that the assumption that the road surface changes slightly becomes invalid. Thus, the previous values or the initial values are used as the starting points. Incidentally, how to determine the change in the road surface will be described in a second embodiment in details.

FIGS. 9(a) to 9(d) respectively show a change in a reset flag, a change in the number of images to be superimposed, a change in the condition under which the feature points are detected, and a change in the number of feature points associated, in the self-position calculating apparatus of the first embodiment. For example, in information process cycles at time t11 and time t12, once the number of feature points associated becomes equal to or less than 3 as shown in FIG. 9(d), it is determined that the condition under which the feature points are detected becomes bad as shown in FIG. 9(c). In response to this, the reset flag is set at "1" as shown in FIG. 9(a).

In the information process cycle at time t11, as shown in FIG. 9(b), the patterned light beam extractor 21 sets the number of images to be superimposed at 1 (or decides to superimpose no image) from the average brightness value of the images obtained with the camera 12. Thus, the patterned light beam extractor 21 extracts the patterned light beam from the single image obtained in the current information process cycle at time t11.

Meanwhile, in the information process cycle at time t12, as shown in FIG. 9(b), the patterned light beam extractor 21 sets the number of images to be superimposed at 2 from the average brightness value of the images obtained with the camera 12. Furthermore, the patterned light beam extractor 21 generates a superimposed image by superimposing two images, that is to say, an image obtained with the camera 12 at time t12 and an image obtained with the camera 12 in the previous information process cycle (by adding up the brightness values). Thus, the patterned light beam extractor 21 extracts the patterned light beam from the superimposed image.

[Information Process Cycle]

Next, as an example of a self-position calculating method of estimating the amount of movement of the vehicle 10 from the image 38 obtained with the camera 12, the information process cycle to be repeatedly performed by the ECU 13 will be described by referring to FIGS. 10 and 11. The information process cycle shown in a flowchart of FIG. 10 is started at the same time as the self-position calculating apparatus becomes activated after the ignition switch of the vehicle 10 is turned on, and is repeatedly performed until the self-position calculating apparatus stops its operation.

In step S01 in FIG. 10, the patterned light beam controller 27 controls the light projector 11 to make the light projector 11 to project the patterned light beam 32a onto the road surface 31. Using the flowchart in FIG. 10, descriptions will be provided for a case where the patterned light beam 32a is continuously projected.

Proceeding to step S11, the ECU 13 controls the camera 12 to obtain the image 38 by making the camera 12 shoot the road surface 31 around the vehicle 10, inclusive of an area of the projected patterned light beam 32a. The ECU 13 stores the data on the image obtained with the camera 12 into the memory. It should be noted that the ECU 13 is capable of automatically controlling the diaphragm of the camera 12. The ECU 13 may be configured to perform a feedback control of the diaphragm of the camera 12 in a way that makes a value of brightness of the next image becomes equal to a median value between the maximum and minimum values in accordance with of an average of the brightness of the image 38 obtained in the previous information process cycle. Otherwise, since the value of the brightness of the area of the projected patterned light beam 32a, the ECU 13 may obtain an average value of the brightness of the previously-obtained image 38 from an area outside a part from which the patterned light beam 32a is extracted.

Proceeding to step S12, the brightness determining section 25 reads the image 38 obtained with the camera 12 from the memory, and determines whether the average brightness of the image is not less than the road surface brightness threshold value Bth. If the brightness determining section 25 determines that the average brightness of the image is less than the road surface brightness threshold value Bth, the ECU proceeds to step S15.

Proceeding to step S15, to begin with, the patterned light beam extractor 21 reads the image 38 obtained with the camera 12 from the memory, and extracts the position of the patterned light beam 32a from the image 38, as shown in FIG. 4(c). The patterned light beam extractor 21 stores the coordinates $(U_j, V_j)$ of the spotlights $S_p$ on the image, which are calculated as the data on the position of the patterned light beam 32a, into the memory.

On the other hand, if it is determined in step S12 that the average brightness of the image is equal to or greater than the road surface brightness threshold value Bth, the ECU proceeds to step S13. In step S13, the patterned light beam extractor 21 sets the number of images (the number of frames) needed to extract the patterned light beam from the average brightness of the image obtained with the camera 12.

In step S14, the patterned light beam extractor 21 reads the image 38 obtained with the camera 12 from the memory, and superimposes the set number of images in the successive frames adds up the brightness values) to generate a superimposed image. Furthermore, the patterned light beam extractor 21 extracts the position of the patterned light beam 32a from the thus-generated superimposed image. The patterned light beam extractor 21 stores the coordinates $(U_j, V_j)$ of the spotlights $S_p$ on the image, which are calculated as the data on the position of the patterned light beam 32a, into the memory.

In step S16, the orientation angle calculator 22 reads the data on the position of the patterned light beam 32a extracted in step S14 or S15 from the memory, calculates the distance and orientation angle from the position of the patterned light beam 32a, and stores the thus-calculated distance and orientation angle into the memory.

Proceeding to step S17, the ECU 13 detects feature points from the image 38, and extracts feature points which can be associated between the previous and current information process cycles. From the positions $(U_i, V_i)$ of the thus-associated feature points on the image, the ECU 13 calculates the amounts of changes in the distance and orientation angle, as well as the amount of movement of the vehicle.

To put it specifically, to begin with, the feature point detector 23 reads the image 38 obtained with the camera 12 from the memory, detects feature points on the road surface 31 from the image 38, and stores the positions $(U_i, V_i)$ of the thus-detected feature points on the image into the memory. The orientation change amount calculator 24 reads the positions $(U_i, V_i)$ of the respective feature points on the image from the memory. From the distance and orientation angle as well as the positions $(U_i, V_i)$ of the feature points on the image, the orientation change amount calculator 24 calculates the relative positions $(X_i, Y_i, Z_i)$ of the feature points relative to the camera 12. Incidentally, the orientation change amount calculator 24 uses the distance and orientation angle set in step S16 in the previous information process cycle. The orientation change amount calculator 24 stores the relative positions $(X_i, Y_i, Z_i)$ of the feature points relative to the camera 12 into the memory.

Thereafter, the orientation change amount calculator 24 stores the positions $(U_i, V_i)$ of the feature points on the image, and the relative positions $(X_i, Y_i, Z_i)$ of the feature points relative to the camera 12 calculated in step S17 in the previous information process cycle, from the memory. Using the relative positions $(X_i, Y_i, Z_i)$ of the feature points associated between the previous and current information process cycles as well as the positions $(U_i, V_i)$ of the thus-associated feature points on the image, the orientation change amount calculator 24 calculates the amounts of changes in the distance and orientation angle. Furthermore, using the relative positions $(X_i, Y_i, Z_i)$ of the feature points calculated in the previous information process cycle and the relative positions $(X_i, Y_i, Z_i)$ of the feature points calculated in the current information process cycle, the orientation change amount calculator 24 calculates the amount of movement of the vehicle. The "amounts of changes in the distance and orientation angle" and the "amount of movement of the vehicle" are used in the process in step S19.

Proceeding to step S18, the ECU 13 set the starting points for the integration operations, depending on the condition under which the feature points are detected, and the state of calculation of the distance and orientation angle using the patterned light beam. Detailed descriptions for this will be provided later by referring to FIG. 11.

Proceeding to step S19, the self-position calculator 26 calculates the current position of the vehicle from the starting points for the integration operations set in the process in step S18, and the amount of movement of the vehicle calculated in the process in step S17.

The self-position calculating apparatus of the embodiment eventually can calculate the current position of the vehicle 10 by adding up the amount of movement of the vehicle while repeatedly performing the above-described series of information process cycle.

Referring to a flowchart in FIG. 11, detailed descriptions will be provided for a procedure for step S18 in FIG. 10. In step S100, the ECU 13 determines whether or not the current information process cycle is one performed for the first time. If the current information process cycle is performed for the first time, or if there is no data on the previous information process cycle, the ECU 13 proceeds to step S104. If the current information process cycle is not one performed for the first time, the ECU 13 proceeds to step S101.

In step S101, the detection condition determining section 28 determines whether or not the condition under which the feature point detector 23 detects the feature points $T_e$ is too bad to satisfy the first criterion. If the detection condition determining section 28 determines that the condition is bad (if YES in step S101), the ECU 13 proceeds to step S102. If the detection condition determining section 28 determines that the condition is not bad (if NO in step S101), the ECU 13 proceeds to step S106. In step S106, the ECU 13 retains the starting points for the integration operations as they are.

In step S102, the ECU 13 determines whether a superimposed image has already been generated. Examples of the case where no superimposed image has been generated yet include a case where a superimposed image is still in the process of being generated because it takes long to obtain the predetermined number of images including images to be obtained in the future, and a case where it is theoretically impossible or difficult to generate a superimposed image. If determining that no superimposed image has been generated yet (if NO in step S102), the ECU 13 proceeds to step S103. If determining that a superimposed image has already been generated (if YES in step S102), the ECU 13 proceeds to step S104.

In step S103, the calculation state determining section 29 determines whether or not the state of calculation of the distance and orientation angle by the orientation angle calculator 22 is too bad to satisfy the second criterion. For example, the calculation state determining section 29 determines whether or not the orientation angle calculator 22 is successful in calculating the distance and orientation angle. If the calculation state determining section 29 determines that the orientation angle calculator 22 succeeds therein (if YES in step S103), the ECU 13 proceeds to step S104. If the calculation state determining section 29 determines that the orientation angle calculator 22 is unsuccessful therein (if NO in step S103), the ECU 13 proceeds to step S105.

In step S104, the ECU 13 sets the starting point at the current position of the vehicle, and further sets the starting points for the integration operations at the distance and orientation angle calculated in step S16 in the same information process cycle. Using the distance and orientation angle as the starting points, the ECU 13 performs the integration operations anew. In addition, using the current position of the vehicle as the starting point, the ECU 13 performs the integration operation on the amount of movement of the vehicle anew.

In step S105, the ECU 13 sets the starting point at the current position of the vehicle, and further sets the starting points for the integration operations at the distance and orientation angle employed in the previous information process cycle. Using the distance and orientation angle as the starting points, the ECU 13 performs the integration operations anew. In addition, using the current position of the vehicle as the starting point, the ECU 13 performs the integration operation on the amount of movement of the vehicle anew. Thereafter, the ECU 13 proceeds to step S19 in FIG. 10.

[Effects of First Embodiment]

As described above, according to the first embodiment, the brightness determining section 25 makes a determination on the detected condition of the patterned light beam. If the detected condition of the patterned light beam is equal to or greater than the predetermined threshold value, the patterned light beam extractor 21 generates the superimposed image by superimposing images in the successive frames between the previous and current frames, and extracts the patterned light beam from the superimposed image. For these reasons, even when the external environment is bright, the patterned light beam projected onto the road surface can be detected accurately. Accordingly, the self-position of the vehicle can be calculated accurately.

Furthermore, the number of images needed for the patterned light beam extractor 21 to generate the superimposed image is set depending on the detected condition of the patterned light beam such as the average brightness of the image obtained with the camera 12. For this reason, the value of the brightness of the patterned light beam to be detected can be controlled depending how bright the external environment is. Accordingly, the patterned light beam can be detected accurately.

Moreover, as in step S102 in FIG. 11, the distance and orientation angle employed in the previous information process cycle, or the predetermined initial distance and the predetermined initial orientation angle, are used as the starting points while the superimposed image is being generated. For this reason, an error in calculating the self-position can be inhibited.

It should be noted that in step S105 in FIG. 11, the ECU 13 may set the starting points for the integration operations at the predetermined initial distance and the predetermined initial orientation angle instead of the distance and orientation angle employed in the previous information process cycle. To put it in detail, if the detection condition determining section 28 determines that the condition under which the feature points are detected is too bad to satisfy the first criterion, and concurrently if the calculation state determining section 29 determines that the state of the calculation of the distance and orientation angle by the orientation angle calculator 22 is too bad to satisfy the second criterion, the self-position calculator 26 may set the starting points for the integration operations at the predetermined initial distance and the predetermined initial orientation angle with at least occupants and load in the vehicle taken into consideration. For example, the self-position calculator 26 may use the distance and orientation angle calculated in step S16 in the information process cycle coming immediately after the self-position calculating apparatus is activated. For this reason, the ECU 13 can update the distance and orientation angle, and calculate the amount of the movement, by setting the starting points at the distance and orientation angle which is not affected by the roll or pitch of the vehicle 10 due to the turn, acceleration or deceleration of the vehicle 10.

[Second Embodiment]
[Hardware Configuration]

Figure 12:
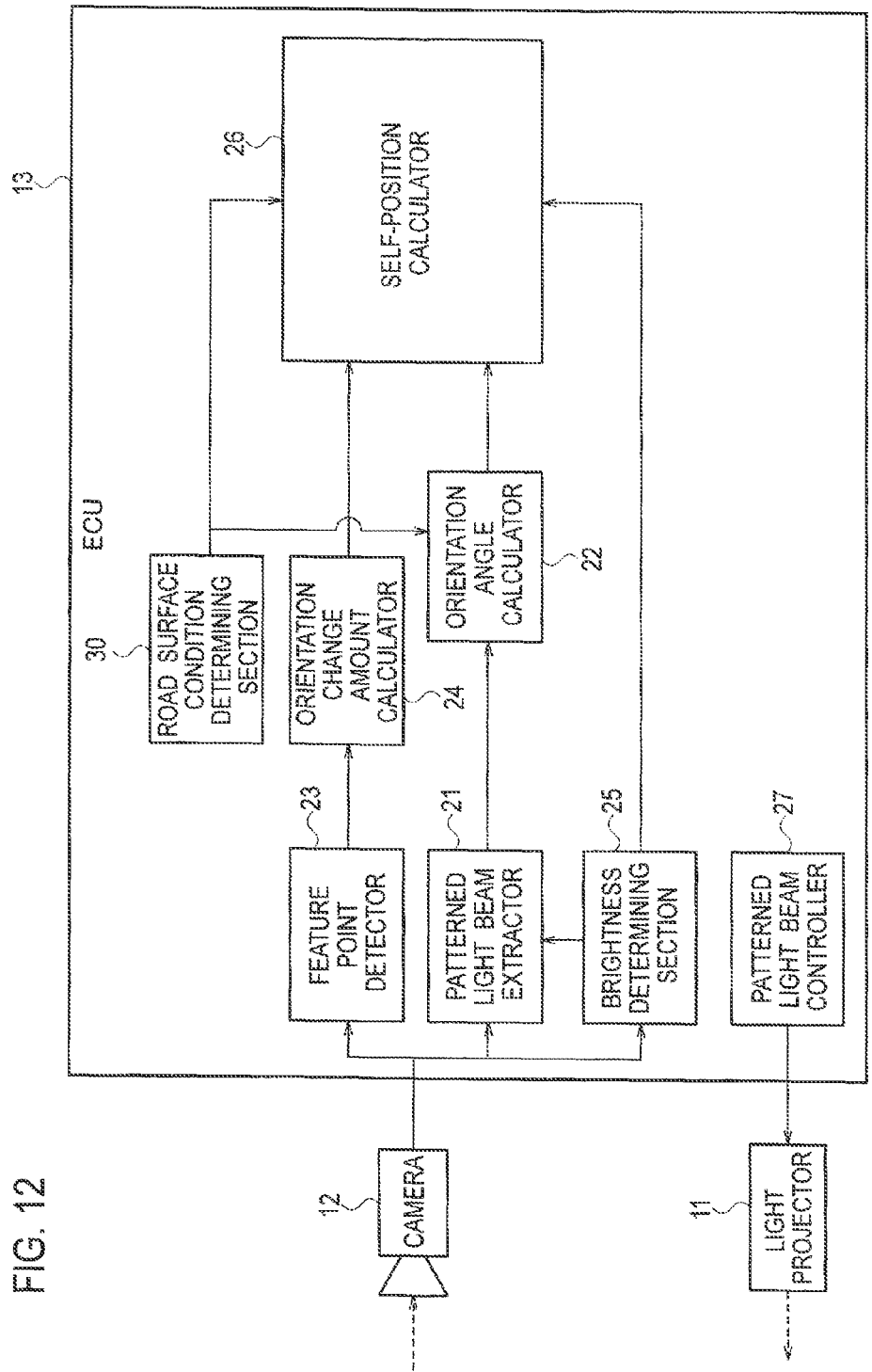
FIG. 12 is a block diagram showing an overall configuration of a self-position calculating apparatus of a second embodiment.

Descriptions will be provided for a second embodiment of the present invention, or a case where the self-position of a vehicle is calculated based on a change in a road surface condition around the vehicle. As shown in FIG. 12, a self-position calculating apparatus of the second embodiment is different from that of the first embodiment in that the self-position calculating apparatus of the second embodiment includes a road surface condition determining section 30 instead of the detection condition determining section 28 and the calculation state determining section 29. The rest of the configuration of the self-position calculating apparatus of the second embodiment is the same as that of the first embodiment. For this reason, description for the rest of the configuration will be omitted.

The road surface condition determining section 30 detects changes in the conditions of the road surface around the vehicle, and determines whether or not the conditions of the road surface change as much as or more than the threshold value. If the road surface condition determining section 30 determines that the conditions of the road surface change as much as or more than the threshold value, the self-position calculator 26 fixes at the current position of the vehicle 10, as well as the current distance and orientation angle of the vehicle 10 relative to the road surface, which are calculated in the previous information process cycle. Thereby, the orientation angle calculator 22 stops calculating the distance and orientation angle of the vehicle 10 relative to the road surface. Meanwhile, the self-position calculator 26 calculates the current position of the vehicle in present, as well as the current distance and orientation angle of the vehicle 10 relative to the road surface, by adding the amount of change in the orientation to the current position of the vehicle 10, as well as the current distance and orientation angle of the vehicle 10 relative to the road surface, which are calculated in the previous information process cycle.

In this respect, descriptions will be provided for how to determine the changes in the conditions of the road surface. In this embodiment, the 35 (5×7) spotlights of the patterned light beam 32a are projected on the road surface. With this taken into consideration, for example, if only 80% or less of the 35 spotlights, or only 28 or less spotlights, can be detected on the image obtained with the camera 12, the road surface condition determining section 30 determines that: the road surface becomes very uneven or bumpy; and the conditions of the road surface change as much as or more than the threshold value.

Instead, the road surface condition determining section 30 may estimate the changes in the conditions of the road surface from an amount of changes in heights of the road surface. The amount of changes in heights of the road surface can be detected from oscillations of a value detected by a stroke sensor attached to the suspension of each wheel of the vehicle. For example, if the oscillations of the value detected by the stroke sensor becomes equal to or greater than 1 Hz, the road surface condition determining section 30 estimates that the road surface becomes very uneven or bumpy, and determines that the conditions of the road surface change as much as or more than the threshold value. Alternatively, the road surface condition determining section 30 may be configured to: calculate a velocity in the vertical direction by integrating values detected by an acceleration sensor for measuring the acceleration in the vertical direction; and thereby determine that the road surface becomes very uneven or bumpy and the conditions of the road surface change as much as or more than the threshold value, when a change in the direction of the velocity becomes equal to or greater than 1 Hz.

Figure 13:
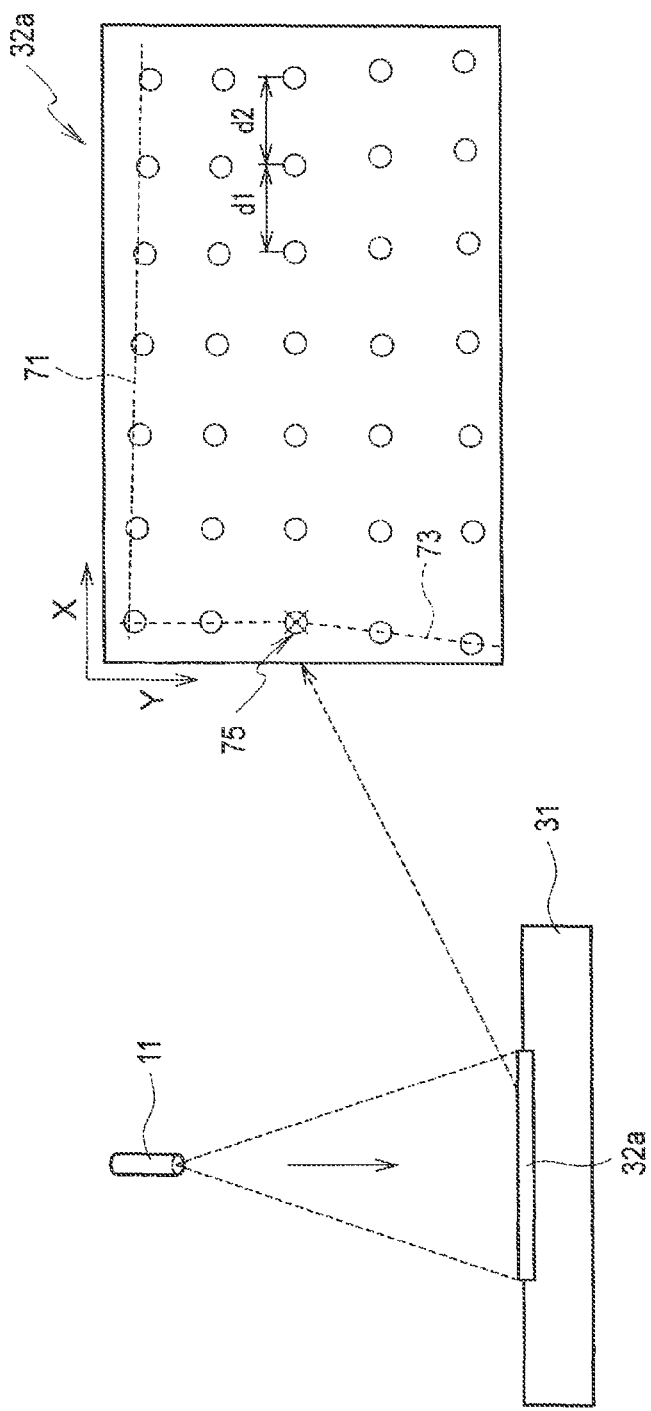
FIG. 13 is a diagram for explaining how to estimate an amount of change in a height of a road surface from a position of a patterned light beam in the second embodiment.

Otherwise, the amount of changes in heights of the road surface may be estimated from the position of the patterned light beam 32a on the image captured with the camera 12. In the embodiment, the patterned light beam 32a as shown in FIG. 13 is projected onto the road surface 31. In this case, a line 71 joining spotlights of the patterned light beam 32a in an X direction, and a line 73 joining spotlights of the patterned light beam 32a in a Y direction are drawn. Thereafter, if as indicated by a point 75, the inclination of any of these lines changes 15 or more degrees in the middle of the line, the road surface condition determining section 30 estimates that the road surface becomes very uneven or bumpy, and determines that the conditions of the road surface change as much as or more than the threshold value. Instead, as shown in FIG. 13, the road surface condition determining section 30 may determine that the conditions of the road surface change as much as or more than the threshold value if a difference between distances d1, d2 between adjacent spotlights changes as much as or more than 50%.

Once the road surface condition determining section 30 thus determines that the conditions of the road surface change as much as or more than the threshold value, the self-position calculator 26 fixes at the current position of the vehicle 10, as well as the current distance and orientation angle of the vehicle 10 relative to the road surface, which are calculated in the previous information process cycle. Thus, the orientation angle calculator 22 stops calculating the distance and orientation angle of the vehicle 10 relative to the road surface. Meanwhile, the self-position calculator 26 calculates the current position of the vehicle 10 in present, as well as the current distance and orientation angle of the vehicle 10 in present relative to the road surface, by adding the amount of change in the orientation to the current position of the vehicle 10, as well as the current distance and orientation angle of the vehicle 10 relative to the road surface, which are calculated in the previous information process cycle.

Figure 14:
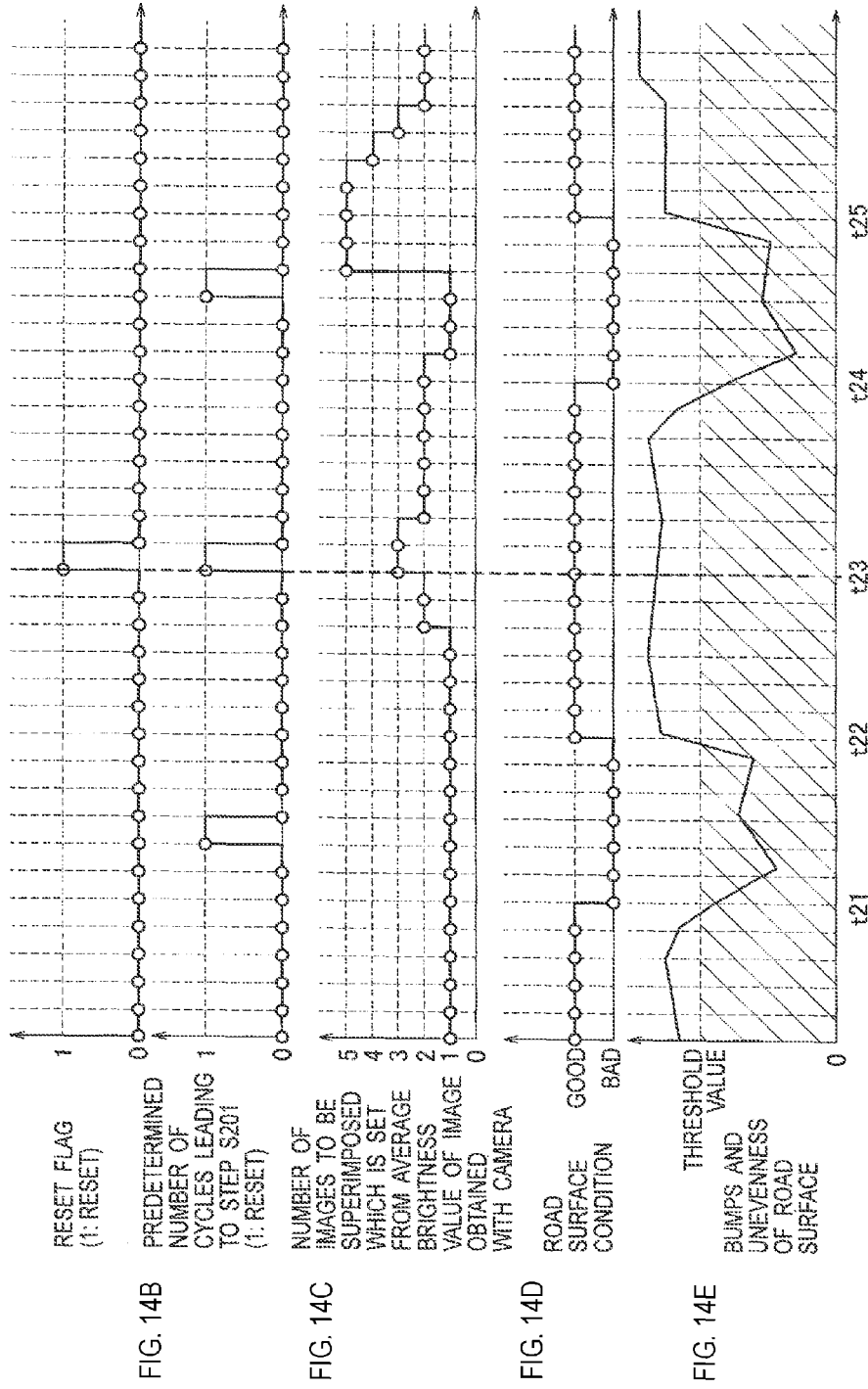
FIGS. 14(a) to 14(e) are timing charts respectively showing a change in a reset flag, a predetermined interval of the step S201, a change in the number of images to be superimposed, a change in a road surface condition between a good one and a bad one, and changes in sizes of bumps (unevenness) of the road surface, in the self-position calculating apparatus of the second embodiment.

For example, as shown in FIG. 14(e), the road surface condition determining section 30 monitors the number of detected spotlights, and sets the threshold value at 28 which corresponds to 80% of the 35 spotlights. In this case, while able to detect 28 or more spotlights, the road surface condition determining section 30 sets an orientation angle calculation flag at "1." Thereby, the orientation angle calculator 22 calculates the distance and orientation angle of the vehicle 10 relative to the road surface. Meanwhile, the self-position calculator 26 calculates the current self-position of the vehicle by: calculating the current distance and orientation angle using the distance and orientation angle of the vehicle calculated by the orientation angle calculator 22; and adding (continuing the integration operation) the amount of movement of the vehicle to the current position of the vehicle 10 which is calculated in the previous information process cycle.

However, at time t21 when the number of detected spotlights becomes less than the threshold value, the self-position calculator 26 switches the orientation angle calculation flag to "0." Thereby, the starting points are fixed at the current position of the vehicle 10, as well as the current distance and orientation angle of the vehicle 10 relative to the road surface, which are calculated in the previous information process cycle. The orientation angle calculator 22 stops calculating the distance and orientation angle of the vehicle 10. Thus, the self-position calculator 26 calculates the current position of the vehicle in present, as well as the current distance and orientation angle of the vehicle in present relative to the road surface, by adding the amount of change in the orientation to the current position of the vehicle 10, as well as the current distance and orientation angle of the vehicle 10 relative to the road surface, which are calculated in the previous information process cycle.

Thereafter, at time t22 when the number of detected spotlights becomes greater than the threshold value again, the orientation angle calculation flag is set at "1." The orientation angle calculator 22 resumes calculating the distance and orientation angle of the vehicle 10. Thereby, the self-position calculator 26 calculates the current distance and orientation angle of the vehicle 10 using the distance and orientation angle of the vehicle 10 calculated by the orientation angle calculator 22. As described above, when the conditions of the road surface change to a large extent, the self-position calculating apparatus of the embodiment uses the current position of the vehicle 10, as well as the current distance and orientation angle of the vehicle 10 relative to the road surface, which are calculated in the previous information process cycle. For this reason, even when the conditions of the road surface change to a large extent, the self-position calculating apparatus of the embodiment is capable of calculating the self-position of the vehicle 10 accurately and stably.

Like in the first embodiment, the patterned light beam extractor 21 generates a superimposed image by superimposing a predetermined number of images, if a detected condition of the patterned light beam is equal to or greater than the predetermined threshold value. The patterned light beam extractor 21 extracts the patterned light beam from the generated superimposed image.

Furthermore, in a case where a large change in the road surface prevents the generation of a superimposed image, the previous values or the initial values are used as the starting points. For example, while the set number of images to be superimposed are being captured, the road surface condition determining section 30 determines whether or not the road surface around the vehicle changes to an extent equal to or greater than a threshold value. When determining that the road surface changes to that extent in 5% or more of the set number of the images, the road surface condition determining section 30 determines that the assumption that the road surface changes slightly becomes unrealistic. Thus, the previous values or the initial values are used as the starting points.

FIGS. 14(a) to 14(b) show a change in a reset flag, a change in the number of images to be superimposed, a change in a road surface condition between a good one and a bad one, and changes in sizes of bumps and unevenness of the road surface, in the self-position calculating apparatus of the second embodiment. As shown in FIG. 14(b), it is determined at predetermined intervals whether or not the superimposed image should be reset. In this respect, each predetermined interval is a period of 10 frames. Nevertheless, each predetermined interval may be a period of 10 seconds.

Between times t21 and t22 as well as between times t24 and t25, the bumps and unevenness of the road surface are equal to or less than the threshold value as shown in FIG. 14(e), and the road surface condition is determined to be bad as shown in FIG. 14(d). Thus, even though reset timings come at the predetermined intervals as shown in FIG. 14(b), the reset flag is left unchanged at "0" as shown in FIG. 14(a), and no superimposed image is generated.

Meanwhile, at time t23, one of the reset timings at the predetermined intervals comes as shown in FIG. 14(b), and the road surface condition is determined to be good as shown in FIG. 14(d). Thus, the reset flag is set at "1" as shown in FIG. 14(a). As shown in FIG. 14(c), the patterned light beam extractor 21 sets the number of images to be superimposed at 3 based on the average bright value of the image obtained with the camera 12. Furthermore, the patterned light beam extractor 21 generates a superimposed image by superimposing two images obtained with the camera 12 in the last and penultimate frames on the one image obtained with the camera 12 at time t23. Thereafter, the patterned light beam extractor 21 extracts the patterned light beam from the thus-generated superimposed image.

[Information Process Cycle]

Figure 15:
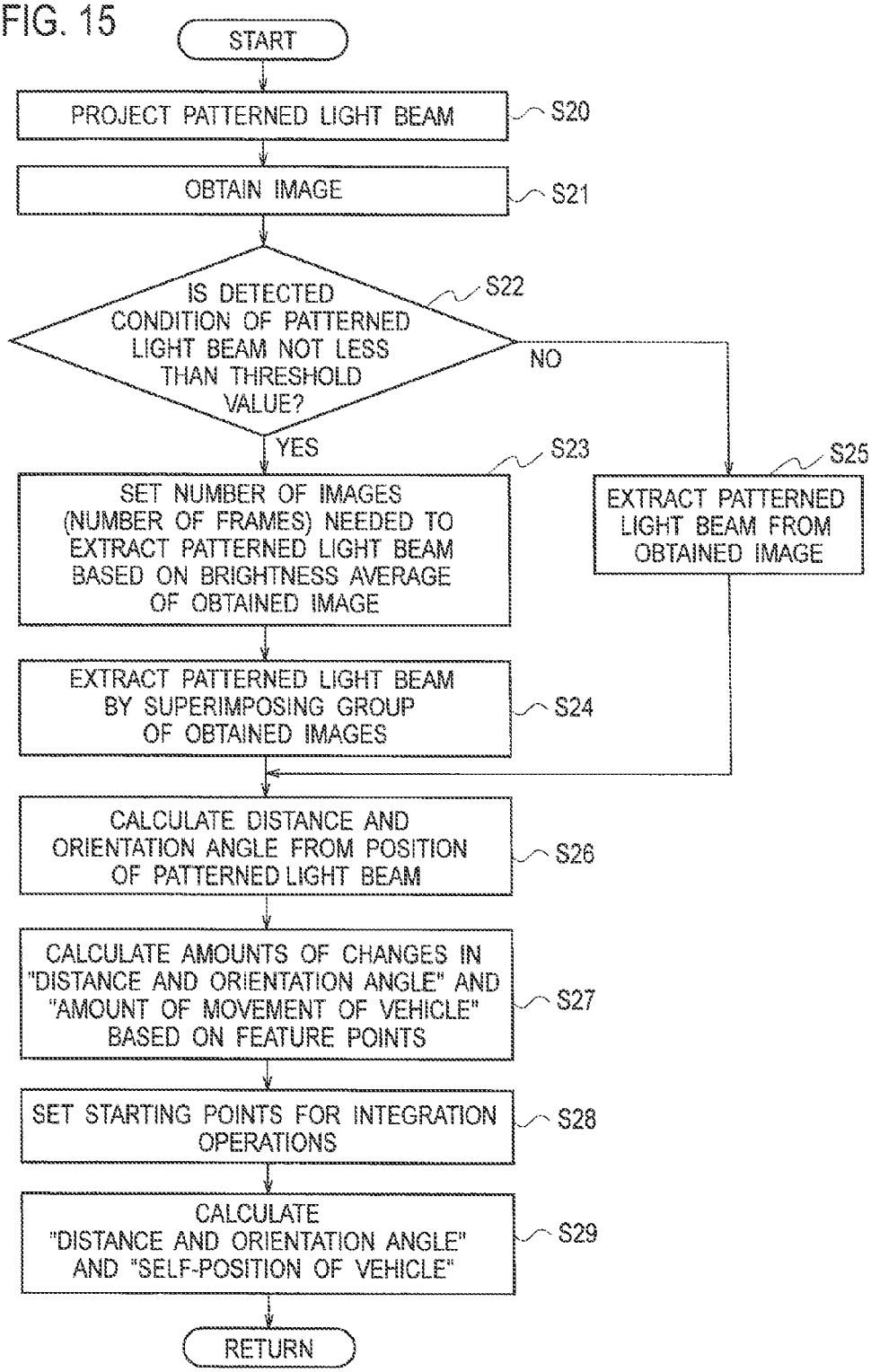
FIG. 15 is a flowchart showing a process procedure for a self-position calculating process to be performed by the self-position calculating apparatus of the second embodiment.
Figure 16:
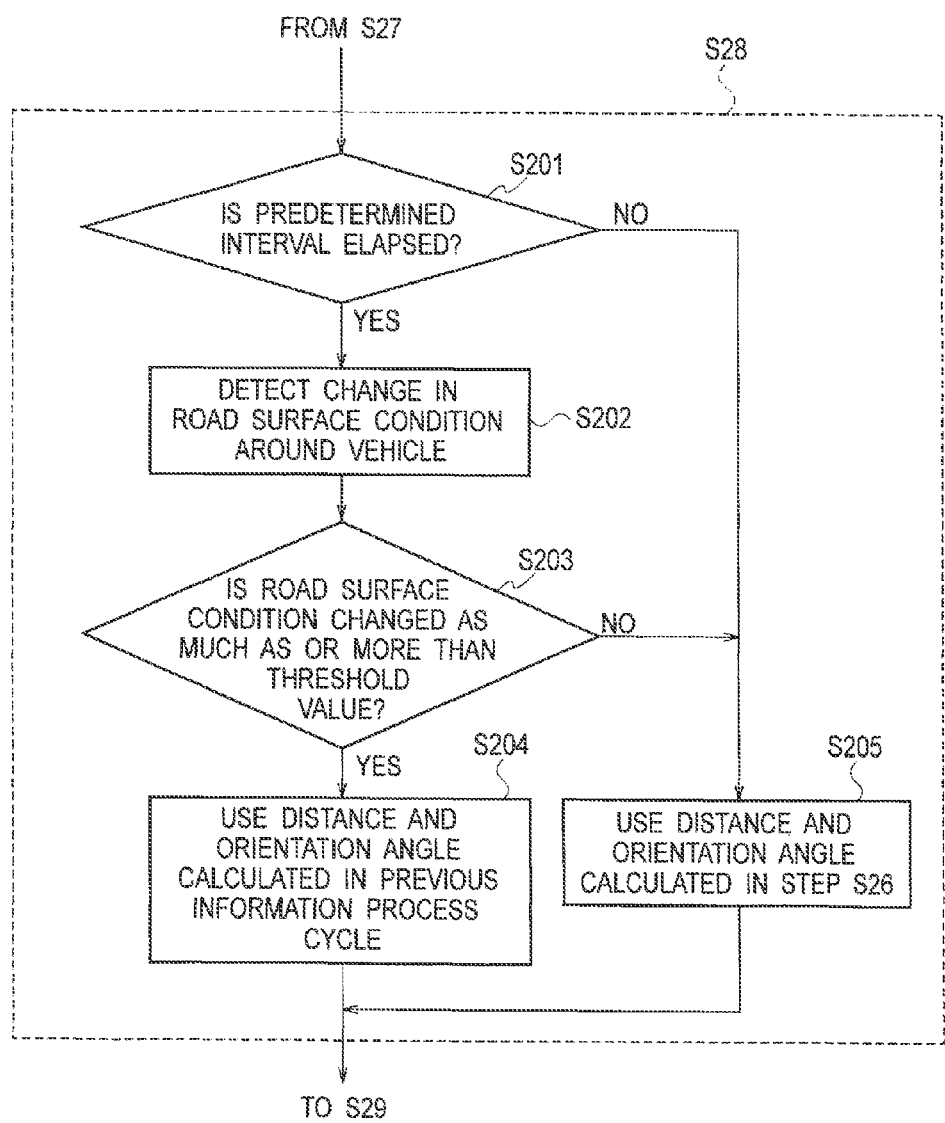
FIG. 16 is a flowchart showing a detailed process procedure for step S28 shown in FIG. 15 to be performed by the self-position calculating apparatus of the second embodiment.

Next, using FIGS. 15 and 16, descriptions will be provided for a self-position calculating method of the second embodiment of the present invention. Procedures for steps S20 to S27 and S29 shown in FIG. 15 are the same as those for steps S10 to S17 and S19 shown in FIG. 10. For this reason, descriptions for such procedures will be omitted.

In step S28, the ECU 13 sets the starting points for the integration operations for calculating the self-position of the vehicle depending on a change in the road surface condition around the vehicle. Referring to a flowchart in FIG. 16, descriptions will be provided for a detailed procedure for step S28 in FIG. 15.

As shown in FIG. 16, in step S201, the road surface condition determining section 30 determines whether or not a predetermined interval has elapsed. The predetermined interval may be set at a length of time which enables the camera to obtain a sufficient number of images needed for the patterned light beam extractor 21 to generate a superimposed image, for example. The road surface condition determining section 30 monitors whether or not an interval count pulse occurs. Once the interval count pulse occurs, the road surface condition determining section 30 determines that one predetermined interval has elapsed, as described using FIG. 14. Thereby, the ECU proceeds to step S202. On the other hand, if no interval count pulse occurs, the road surface condition determining section 30 determines that no predetermined interval has elapsed yet. Thereby, the ECU proceeds to step S205.

In step S202, the road surface condition determining section 30 detects a change in the road surface condition around the vehicle. To put it specifically, the road surface condition determining section 30 detects how many of the spotlights in the patterned light beam 32a are detected, or detects fluctuations in values detected by the stroke sensor attached to each wheel. Otherwise, the road surface condition determining section 30 may be configured to calculate a velocity in the vertical direction by integrating values detected by an acceleration sensor for measuring the acceleration of the vehicle in the vertical direction, or to detect the position of the patterned light beam 32a.

Subsequently, in step S203, the road surface condition determining section 30 determines whether or not the conditions of the road surface change as much as or more than the threshold value. For example, in a case where the road surface condition determining section 30 is configured to detect the number of spotlights of the patterned light beam 32a, if only 28 or less spotlights out of the 35 spotlights can be detected on the image obtained with the camera, the road surface condition determining section 30 determines that: the road surface becomes very uneven or bumpy; and the conditions of the road surface change as much as or more than the threshold value.

Otherwise, in the case of using the stroke sensor, the road surface condition determining section 30 determines that the conditions of the road surface change as much as or more than the threshold value if the oscillations of the detected value become equal to or greater than 1 Hz. Furthermore, in a case where the road surface condition determining section 30 is configured to use the acceleration sensor, the road surface condition determining section 30 calculates the velocity in the vertical direction by integrating the values detected by the acceleration sensor. If the changes in the direction of the velocity become equal to or greater than 1 Hz, the road surface condition determining section 30 determines that the conditions of the road surface change as much as or more than the threshold value.

Moreover, in a case where the road surface condition determining section 30 is configured to use the position of the patterned light beam 32a, if the inclination of one of the lines joining the spotlights changes 15 or more degrees in its middle of the line, the road surface condition determining section 30 determines that the conditions of the road surface change as much as or more than the threshold value. Otherwise, if a difference between distances between adjacent spotlights changes as much as or more than 50%, the road surface condition determining section 30 may determine that the conditions of the road surface change as much as or more than the threshold value.

As described above, the road surface condition determining section 30 determines whether or not the conditions of the road surface around the vehicle change as much as or more than the threshold value. If the road surface condition determining section 30 determines that the conditions of the road surface around the vehicle change as much as or more than the threshold value (YES in step S203), the procedure proceeds to step S204. On the other hand, if the road surface condition determining section 30 determines that the conditions of the road surface around the vehicle does not change so much as or more than the threshold value (NO in step S203), the procedure proceeds to step S205.

In step S204, the self-position calculator 26 fixes the current position of the vehicle 10, as well as the current distance and orientation angle of the vehicle 10 relative to the road surface, at the current position of the vehicle 10, as well as the current distance and orientation angle of the vehicle 10 relative to the road surface, which are calculated in the previous information process cycle. In other words, the self-position calculator 26 sets the current position of the vehicle 10, as well as the current distance and orientation angle of the vehicle 10 relative to the road surface, which are calculated in the previous information process cycle, as the starting points of the integration operation.

Thereby, the orientation angle calculator 22 stops calculating the distance and orientation angle of the vehicle 10 relative to the road surface. Meanwhile, the self-position calculator 26 calculates the current position of the vehicle 10 in present, as well as the current distance and orientation angle of the vehicle 10 in present relative to the road surface, by adding the amount of change in the orientation to the current position of the vehicle 10, as well as the current distance and orientation angle of the vehicle 10 relative to the road surface, which are calculated in the previous information process cycle.

On the other hand, in step S205, the self-position calculator 26 sets the starting points of the integration operation at the current position of the vehicle 10, as well as the current distance and orientation angle of the vehicle 10 relative to the road surface, which are calculated in step S15 in the current information process cycle. Thereby, the self-position calculator 26 calculates the current position of the vehicle 10, as well as the current distance and orientation angle of the vehicle 10 relative to the road surface, by adding the amount of change in the orientation to the current position of the vehicle 10, as well as the current distance and orientation angle of the vehicle 10 relative to the road surface, which are calculated in the current information process cycle.

Once as described above, the self-position calculator 26 sets the starting points of the integration operation for calculating the current position of the vehicle 10 in present, as well as the current distance and orientation angle of the vehicle 10 in present relative to the road surface, the process in step S28 is terminated, and the procedure proceeds to step S29 in FIG. 15.

[Effects of Second Embodiment]

As described above, according to the second embodiment, the brightness determining section 25 makes a determination on the detected condition of the patterned light beam. If the detected condition of the patterned light beam is equal to or greater than the predetermined threshold value, the patterned light beam extractor 21 generates the superimposed image by superimposing images in the respective frames. For this reason, even when the external environment is bright, the patterned light beam projected onto the road surface can be detected accurately. Accordingly, the self-position of the vehicle can be calculated accurately.

Furthermore, the number of images needed for the patterned light beam extractor 21 to generate the superimposed image is set depending on the pattern detection condition such as the average brightness of the image obtained with the camera 12. For this reason, the value of the brightness of the patterned light beam to be detected can be controlled depending how bright the external environment is. Accordingly, the patterned light beam can be detected accurately.

[Third Embodiment]

[Hardware Configuration]

Figure 17:
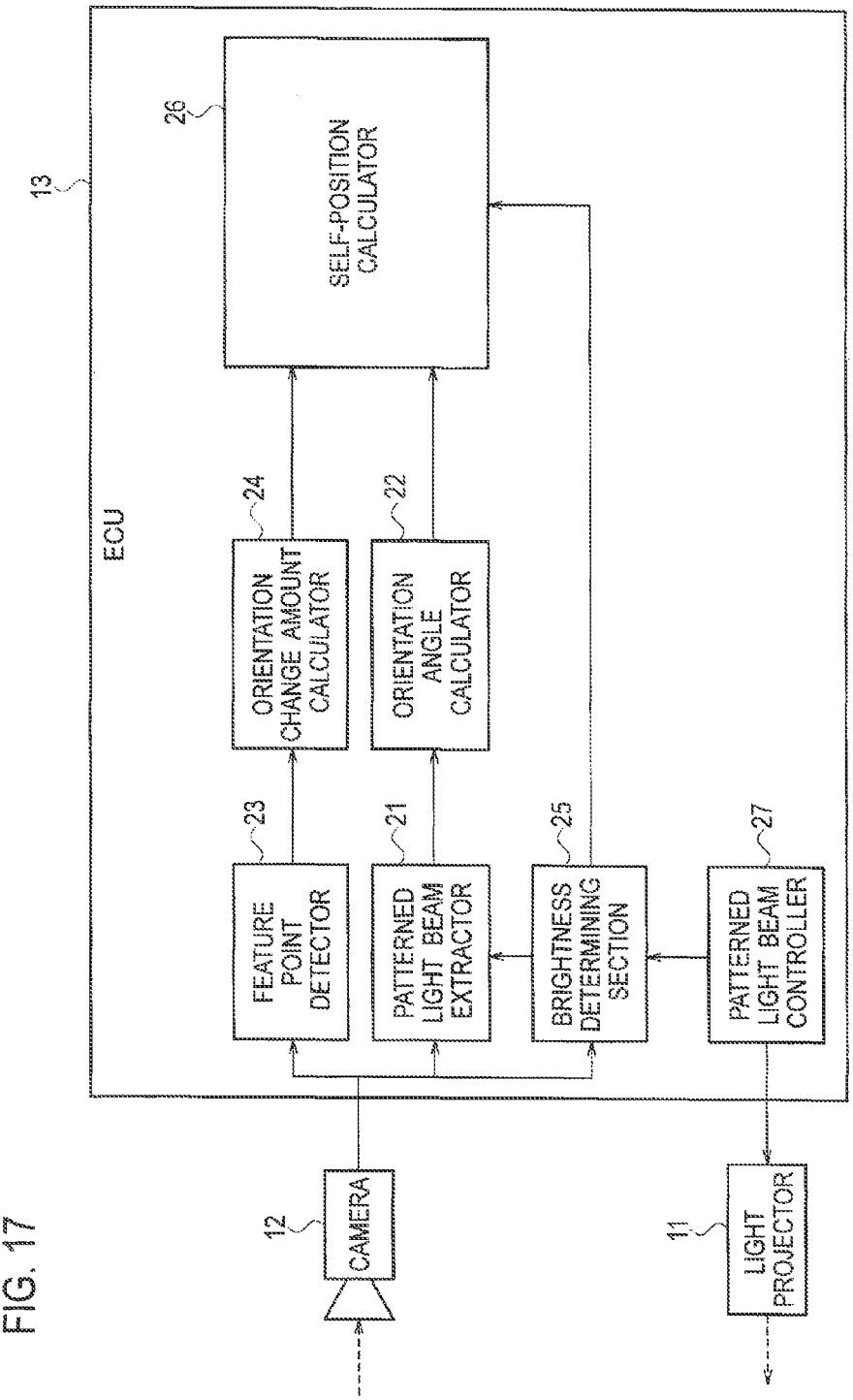
FIG. 17 is a block diagram showing an overall configuration of a self-position calculating apparatus of the third embodiment.

Descriptions will be provided for a third embodiment of the present invention, or a case where out of images obtained by synchronous detection, images corresponding to a predetermined number of cycles are superimposed to generate a superimposed image. As shown in FIG. 17, a self-position calculating apparatus of the third embodiment is different from that of the first embodiment in that the self-position calculating apparatus of the third embodiment includes neither the detection condition determining section 28 nor the calculation state determining section 29. The rest of the configuration of the self-position calculating apparatus of the third embodiment is the same as that of the first embodiment. For this reason, description for the rest of the configuration will be omitted.

The patterned light beam controller 27 starts to project the patterned light beam 32a whose brightness periodically changes. Thereafter, the patterned light beam controller 27 continues projecting the patterned light beam 32a until the self-position calculating apparatus stops its operation. Otherwise, the patterned light beam controller 27 may be configured to project the patterned light beam 32a depending on the necessity. In the embodiment, electric power to be supplied to the light projector 11 is controlled in order that as an example of the change in the brightness, the brightness of a projected light pattern changes in the same way as does a sine wave of a predetermined frequency.

The patterned light beam extractor 21 reads the images obtained with the camera 12 from the memory, performs a synchronous detection process on the images at the above-mentioned predetermined frequency, and extracts the patterned light beam 32a from the thus-processed images.

Next, descriptions will be provided for the synchronous detection process. A measured signal included in the images captured with the camera 12 is expressed with sin ($\omega 0+\alpha$). This measured signal contains signals representing sunlight and artificial light both having various frequency components in addition to a signal representing the projected light pattern. With this taken into consideration, the measured signal sin ($\omega 0+\alpha$) is multiplied by a reference signal sin ($\omega r+\beta$) whose frequency is a modulation frequency $\omega r$. Thus, the multiplication yields:

$$\cos(\omega 0 - \omega r + \alpha - \beta)/2 - \cos(\omega 0 + \omega r + \alpha + \beta)/2.$$

When passing the thus-obtained measured signal, a low-pass filter removes signals having frequencies $\omega 0$ which are unequal to $\omega r$, or sunlight and artificial light which are not the projected light pattern, and whose frequencies are unequal to $\omega r$. In contrast, a signal having a frequency $\omega 0$ which is equal to $\omega r$, or the projected light pattern whose frequency is equal to $\omega r$, can be extracted because the projected light pattern is represented by cos ($\alpha - \beta$)/2. The use of the synchronous detection process like this makes it possible to obtain an image representing only the extracted projected light pattern.

In other words, in the embodiment, the patterned light beam controller 27 modulates the brightness of the patterned light beam 32a with the predetermined modulation frequency $\omega r$ which is set in advance. Thus, the projected light pattern whose brightness is modulated with the frequency $\omega r$ is projected onto the road surface. Meanwhile, the orientation angle calculator 22 can extract only the projected light pattern by multiplying an image captured with the camera 12 (the measured signal) by the modulation frequency $\omega r$.

Figures 18A, 18B:
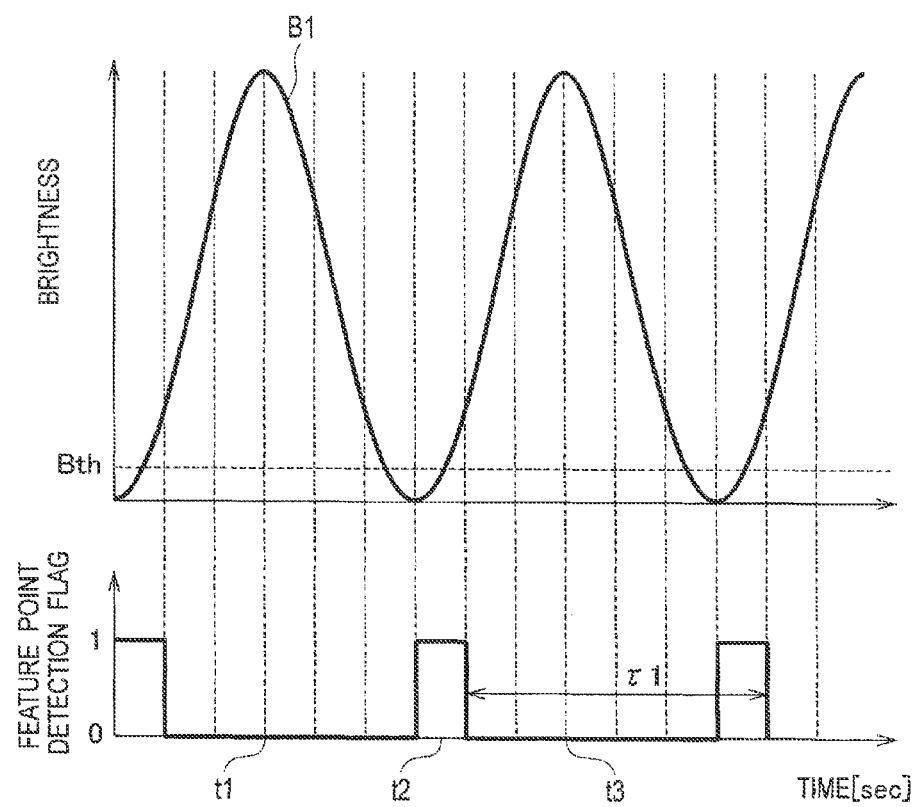
FIGS. 18(a) and 18(b) are timing charts respectively showing a change in brightness and a change in a feature point detection flag in the self-position calculating apparatus of a third embodiment.

FIG. 18($a$) is a characteristic diagram showing a change in the brightness of the patterned light beam 32a projected by the light projector 11. FIG. 18($b$) is a characteristic diagram showing a change in a feature point detection flag. For example, the brightness is controlled in a way that makes the brightness change in the same way as does the sine wave as shown in FIG. 18($a$), In this respect, descriptions will be provided for how to set the brightness of the patterned light beam 32a. In this embodiment, the maximum brightness of the patterned light beam 32a (upper peaks of a brightness B1 shown in FIG. 18($a$)) is set in order that the patterned light beam 32a can be detected even under the bright sky around the summer solstice (in June) when the amount of sunshine is the highest in the year. In addition, the minimum brightness of the patterned light beam (lower peaks of the brightness B1 shown in FIG. 18($a$)) is set in order that the projected light pattern is not wrongly detected as feature points of the road surface with a probability of 99% or more in the night when the influence of the patterned light beam is the largest in a day.

The frequency for modulating the brightness of the patterned light beam is set at 200 [Hz], and the frame rate of the camera 12 (the number of images captured per second) is set at 2400 [fps], for example. The reason for these settings is that the embodiment assumes that the maximum speed of the vehicle is 72 km/h (approximately equal to 20 m/s), and therefore reduces the amount of movement of the vehicle per frame cycle to 0.1 m or less. This is because judging from the concept of the embodiment, it is desirable that the area onto which the patterned light bean 32a is projected and the area from which feature points are detected be as near to each other as possible, or coincide with each other. Furthermore, judging from the concept of the synchronous detection, a larger amount of movement per cycle and changes in the road surface during its movement are likely to allow changes in sunlight and artificial light other than the projected light pattern, and to thus make the precondition for the synchronous detection become invalid. The embodiment avoids this likelihood by reducing the amount of movement per cycle. For this reason, use of a higher-speed camera and a further reduction in the cycle make it possible to expect a further improvement of the performance.

Figure 19A:
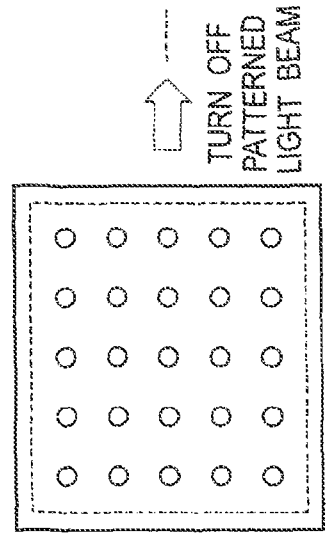
FIGS. 19(a) to 19(c) are explanatory diagrams showing patterned light beams and feature points in the self-position calculating apparatus of the third embodiment.
Figure 19B:
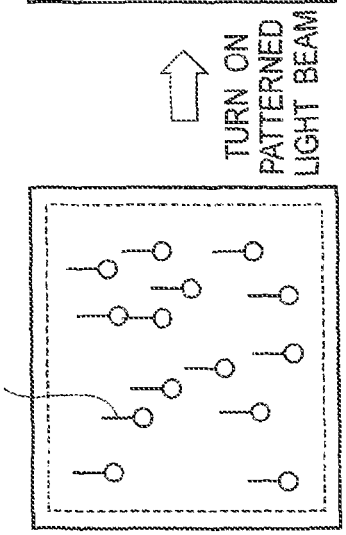
Figure 19C:
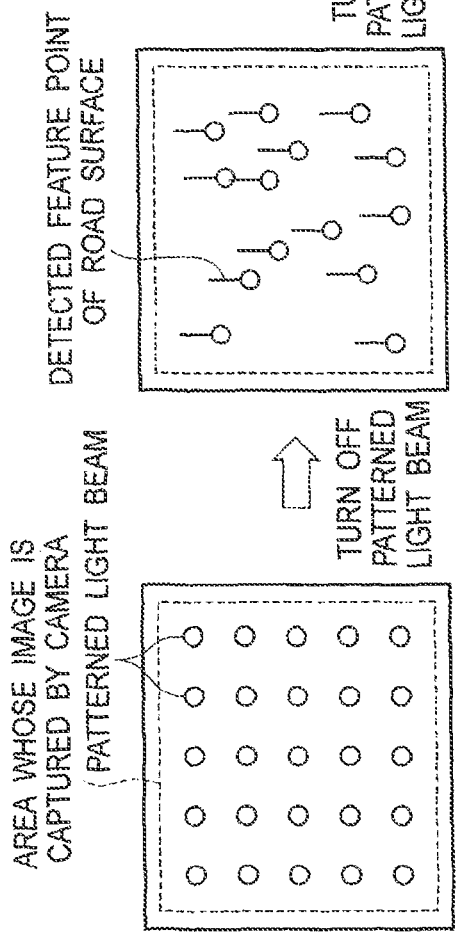

The feature point detector 23 determines whether the brightness of the patterned light beam 32a projected by the light projector 11 is not greater than the brightness threshold value Bth set in advance. If the brightness is greater than the brightness threshold value Bth, the patterned light beam extractor 21 extracts the patterned light beam 32a by the above-described synchronous detection process. For example, as shown in FIGS. 19($a$) and 19($c$), the patterned light beam extractor 21 extracts the patterned light beam 32a by the synchronous detection process from an image captured at time t1 or at time t3 (when the brightness B1 is greater than the brightness threshold value Bth) shown in FIG. 18($a$).

On the other hand, if the brightness is equal to or less than the brightness threshold value Bth, the feature point detector 23 detects feature points present on the road surface 31. To put it specifically, in the case where the brightness B1 of the patterned light beam 32a changes in the same way as does the sine wave as shown in FIG. 18($a$), the feature point detector 23 detects feature points during periods of time when the brightness B1 is not greater than the brightness threshold value Bth. In other words, as shown in FIG. 18($b$), the feature point detector 23 holds the feature point detection flag at "1" during the periods of time when the brightness B1 is not greater than the brightness threshold value Bth, and detects feature points during these periods of time. For example, as shown in FIG. 19($b$), the feature point detector 23 detects feature points from an image captured at time t2 (when the brightness B1 is equal to or greater than the brightness threshold value Bth) shown in FIG. 18($b$). Thereafter, based on the on-image positions of the feature points detected by the feature point detector 23, the orientation change amount calculator 24 calculates an amount of change in each feature point relative to the camera 12. In this respect, the area from which the feature points are detected fully coincides with, or partially overlaps, the area onto which the patterned light beam 32a is projected.

In the embodiment, when the brightness determining section 25 determines that the detected condition of the patterned light beam is equal or greater than the predetermined threshold value, the patterned light beam extractor 21 generates a superimposed image by: performing the synchronous detection on the images captured with the camera 12 with the predetermined modulation frequency to obtain synchronized images which correspond to the predetermined number of cycles; and superimposing the synchronized images (adding up their brightness values). An image representing only the extracted projected light pattern can be obtained from an image captured during one reference signal cycle. In a case where the process is performed in two or more cycles, the images are superimposed by adding up the brightness values of the pixels on the images extracted in the respective cycles. Incidentally, the extraction of the spotlights from the superimposed image may be achieved by applying a binarization process to a standardized result which is obtained by division by the number of the superimposed images whose pixels' brightness values are added up.

Next, descriptions will be provided for an example of how to set the predetermined cycles for the superimposition. To begin with, referring to the ratio Rap obtained using the nearest 10 to which the brightness average value of the image obtained with the camera 12 is rounded, Fn is obtained using Equation (7) given below. The number of the predetermined cycles is set at the nearest whole value to which the thus-obtained Fn is rounded. To put it specifically, when the brightness average of the asphalt paved road surface is less than 50% of the brightness average of the patterned light beam, the number of the predetermined cycles is set at 1. When 75%, the number of the predetermined cycles is set at 2. When 90% or greater, the number of the predetermined cycles is set at 5:

$$Fn=\max\{(0.5 \div (1-Rap)), 10\} \qquad (7).$$

It should be noted that the number of the predetermined cycles may be set at a number which makes a success rate of the extraction of the spotlights of the patterned light beam certain to become 95% or greater by actually performing the synchronous detection for the extract in an experiment for obtaining ratios Rap using the brightness average value Ba and values obtained by actually sequentially adding 10 scale points to the brightness average value B a.

In this respect, if no superimposed image can be generated because the vehicle speed is too fast, the previous values or the initial values are used. For example, when the brightness average of the asphalt paved road surface is 75% of the brightness average of the patterned light beam, two cycles are needed for the synchronous detection. Furthermore, when the number of images needed per cycle in the synchronous detection is at 4, and the vehicle speed, which is obtained using Equation (8) given below, is equal to or greater than 90 km/h, the previous values or the initial values are used as the starting points:

$$0.2[m] \div \{(4[\text{images}] \times 2[\text{cycles}]) \div 1000[\text{fps}]\} = 25[m/s] \qquad (8)$$
$$= 90[km/h].$$

Meanwhile, if no superimposed image can be generated because the change in the road surface is large, the previous values or the initial values are used. It is determined whether or not the road surface condition around the vehicle changes to an extent equal to or greater than the threshold value during the set number of cycles for the synchronous detection. If 5% or more of the images captured during the set number of cycles for the synchronous detection show the road surface condition around the vehicle changes to the extent equal to or greater than the threshold value, it is determined that the assumption that the road surface changes slightly becomes invalid. Thus, the previous values or the initial values are used as the starting points. In the case where the synchronous detection is used, the determination on the road surface condition may be made using the stroke sensor.

FIGS. 20(*a*) to 20(*d*) respectively show a change in a reset flag, a change in timing of termination of each cycle, a change in the number of frequencies to be superimposed, and a change in light projection power in the self-position calculating apparatus of the third embodiment. Each of times t31, t32, t33 is timing of the termination of each reference signal projection cycle, as shown in FIG. 20(*b*). At times t31, t32, t33, the cyclic light projection power becomes smallest as shown in FIG. 20(*d*), and the reset flag is set at "1" as shown in FIG. 20(*a*).

At times t31, t33, the number of cycles to be superimposed is set at 1 as shown in FIG. 20(*c*). Thus, the patterned light beam extractor 21 generates a superimposed image by superimposing an image corresponding to one cycle immediately before time t31, and a superimposed image by superimposing an image corresponding to one cycle immediately before time t33.

On the other hand, at time t32, the number of cycles to be superimposed is set at 2 as shown in FIG. 20(*c*). Thus, the patterned light beam extractor 21 generates a superimposed image by superimposing images corresponding to two cycles T1, T2 immediately before time t32.

[Information Process Cycle]

Next, as an example of a self-position calculating method of estimating the amount of movement of the vehicle 10 from the image 38 (see FIG. 5) obtained with the camera 12, an information process cycle to be repeatedly performed by the ECU 13 will be described by referring to a flowchart shown in FIG. 21.

Figure 21:
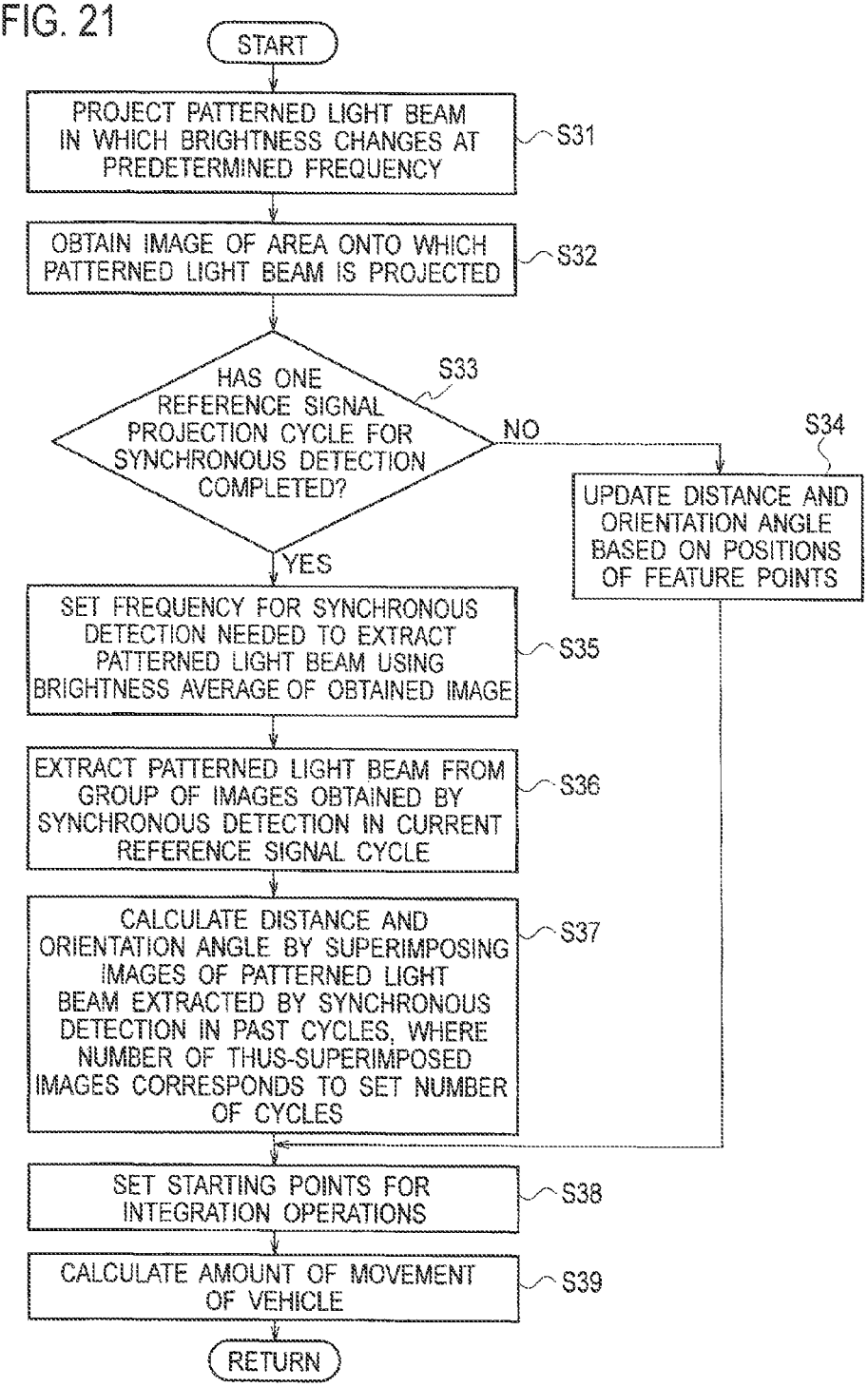
FIG. 21 is a flowchart showing a process procedure to be followed by the self-position calculating apparatus of the third embodiment.

The information process cycle shown in FIG. 21 is started at the same time as the self-position calculating apparatus 100 becomes activated after the ignition switch of the vehicle 10 is turned on, and is repeatedly performed until the self-position calculating apparatus 100 stops its operation.

First of all, in step S31 in FIG. 21, the patterned light beam controller 27 controls the light projector 11 to make the light projector 11 project the patterned light beam onto the road surface 31 around the vehicle. In this case, the patterned light beam controller 27 controls the light projection power in order that, as shown in FIG. 18(*a*), the brightness B1 of the patterned light beam changes in the same way as does the sine wave of a predetermined frequency. For example, the frequency of the sine wave is set at 200 [Hz]. Thus, the patterned light beam whose brightness B1 changes with time as the same way as does the since wave is projected onto the road surface 31.

In step S32, the camera 12 captures an image of the road surface 31 including an area onto which the patterned light beam is projected.

In step S33, the ECU 13 determines whether or not one reference signal projection cycle for the synchronous detection has completed. If the ECU 13 determines that one reference signal projection cycle for the synchronous detection has completed, the ECU 13 proceeds to step S35. If the ECU 13 determines that one reference signal projection cycle for the synchronous detection has not completed yet, the ECU 13 proceeds to step S34.

In step S34, the feature point detector 23 detects feature points (for example, uneven portions present on the asphalt) from the image 38, and extracts feature points which can be associated between the previous and current information process cycles, and updates the distance and orientation angle from the on-image positions ($U_j$, $V_j$) of the thus-extracted feature points.

To put it specifically, when the feature point detection flag is set at "1," the feature point detector 23 reads the image 38 obtained with the camera 12 from the memory, detects the feature points on the road surface 31 from the image 38, and stores the on-image positions ($U_j$, $V_j$) of the respective feature points into the memory. The orientation change amount calculator 24 reads the on-image positions ($U_j$, $V_j$)

of the respective feature points from the memory, and calculates the relative positions ($X_i$, $Y_i$, $Z_i$) of the feature points relative to the camera 12 from the distance and orientation angle, as well as the on-image positions ($U_i$, $V_i$) of the feature points. The orientation change amount calculator 24 stores the relative positions ($X_i$, $Y_i$, $Z_i$) of the feature points relative to the camera 12 into the memory.

Thereafter, the orientation change amount calculator 24 reads the on-image positions ($U_i$, $V_i$) of the feature points and the relative positions ($X_i$, $Y_i$, $Z_i$) of the feature points calculated in step S31 in the previous information process cycle from the memory. The orientation change amount calculator 24 calculates the amounts of changes in the distance and orientation angle using the relative positions ($X_i$, $Y_i$, $Z_i$) and the on-image positions ($U_i$, $V_i$) of the feature points which can be associated between the previous and current information process cycles. The orientation change amount calculator 24 updates the distance and orientation angle by adding the above-mentioned amounts of changes in the distance and orientation angle to the distance and orientation angle obtained in the previous information process cycle. After that, the orientation change amount calculator 24 stores the thus-updated distance and orientation angle into the memory. In other words, the orientation change amount calculator 24 updates the distance and orientation angle by performing the integration operation on the distance and orientation angle set by the process in step S34 or S37 (described later) in the previous cycle by adding the amounts of changes in the distance and orientation angle calculated in the current information process cycles. Thereafter, the ECU 13 proceeds to step S38.

On the other hand, in step S35, from the brightness average of the image obtained with the camera 12, the patterned light beam extractor 21 sets the frequency for the synchronous detection which is needed to extract the patterned light beam.

In step S36, the patterned light beam extractor 21 extracts the patterned light beam from a group of images obtained by the synchronous detection in the current reference signal cycle.

In step S37, the patterned light beam extractor 21 generates a superimposed image by superimposing images of the patterned light beam extracted by the synchronous detection in the past cycles, where the number of the thus-superimposed images corresponds to the number of cycles set in step S35. The patterned light beam extractor 21 further extracts the position of the patterned light beam from the thus-generated superimposed image. Based on the position of the patterned light beam, the orientation angle calculator 22 calculates the distance and orientation angle.

In step S38, the ECU 13 selects the starting points for the integration operations. This process is achieved by: selecting the distance and orientation angle calculated from the position of the patterned light beam in the first information process cycle; and set the starting points for the integration operations at the thus-selected distance and orientation angle. Thereafter, in a case where the predetermined condition is satisfied, or in a case where the condition of the feature point detection by the feature point detector 23 deteriorates to prevent multiple feature points from being detected at timing when the flag is set at "1," the ECU 13 resets the starting points for the calculation of the amount of the movement at the distance and orientation angle calculated from the position of patterned light beam, or at the distance and orientation angle calculated by the process in step S37. On the other hand, in a case where the feature point detector 23 detects the feature points normally, the ECU 13 updates the distance and orientation angle based on the positions of the respective feature points.

In other words, in the case where the feature point detector 23 does not detect the feature points normally, the distance and orientation angle of the camera 12 cannot be set with high accuracy. If the amount of movement of the vehicle is calculated using the inaccurate distance and orientation angle, the amount of movement of the vehicle cannot be detected with high accuracy. In such a case, therefore, the starting points for the calculation of the amount of the movement are set at the distance and orientation angle calculated from the position of the patterned light beam. Thereby, large errors in the distance and orientation angle are prevented.

Subsequently, in step S39, the self-position calculator 26 calculates the amount ($\Delta L$) of movement of the camera 12 relative to the road surface 31, or the amount of movement of the vehicle 10, from the distance and orientation angle calculated by the process in step S34 or S37, the starting points of the integration operations, and the amounts of changes in the on-image positions ($U_i$, $V_i$) of the feature points.

Thus, the self-position calculating apparatus of the third embodiment is capable of calculating the position of the vehicle 10 by repeatedly performing the above-described series of information process cycle to adding up the amounts of movement of the vehicle 10.

[Effects of Third Embodiment]

As described above, according to the third embodiment, the brightness determining section 25 makes a determination on the detected condition of the patterned light beam. If the detected condition of the patterned light beam is equal to or greater than the predetermined threshold value, the patterned light beam extractor 21 generates the superimposed image by superimposing images in the respective frames, where the number of the thus-superimposed images corresponds to the predetermined number of cycles. For this reason, even when the external environment is bright, the patterned light beam projected onto the road surface can be detected accurately. Accordingly, the self-position of the vehicle can be calculated accurately.

Furthermore, the number of cycles needed for the patterned light beam extractor 21 to generate the superimposed image is set depending on the pattern detection condition such as the average brightness of the image obtained with the camera 12. For this reason, the value of the brightness of the patterned light beam to be detected can be controlled depending how bright the external environment is. Accordingly, the patterned light beam can be detected accurately.

(Another Embodiment)

Although the first to third embodiments of the present invention have been described as above, none of the descriptions and drawings constituting parts of the disclosure shall be construed as limiting the present invention. The disclosure will make various alternative embodiments, examples and operational techniques clear to those skilled in the art.

The first to third embodiments of the present invention have discussed mainly the case where the superimposed image is generated by superimposing images obtained with the camera 12 from the past to the present. Nevertheless, the superimposed image may be generated by superimposing images which includes one or more images to be obtained with the camera 12 in the future. The inclusion of images to be obtained in the future is assumed to occur, for example in a case where the patterned light beam is projected intermittently and not constantly. In this case, the patterned light extractor 21 generates the superimposed image once all the images needed to extract the patterned light beam are obtained. The self-position calculator may be configured to start the integration operations using the previous values or the initial values set as the starting point before all the images needed to extract the patterned light beam are obtained (while the superimposed image is being generated).

Although FIG. 2 shows the example where the camera 12 and the light projector 11 are installed in the front of the vehicle 10, the camera 12 and the light projector 11 may be installed in the sides, rear or bottom of the vehicle 10. Furthermore, although FIG. 2 shows the four-wheeled passenger car as an example of the vehicle 10 of the embodiments, the present invention is applicable to all the moving bodies (vehicles), such as motorbikes, trucks and special vehicles for transporting construction machines, as long as feature points on road surfaces and wall surfaces can be captured from such moving bodies.

REFERENCE SIGNS LIST

1 ECU
10 vehicle
11 light projector
12 camera (image capturing unit)
21 patterned light beam extractor (superimposed image generator)
22 orientation angle calculator
23 feature point detector
24 orientation change amount calculator
25 brightness determining section (patterned light beam detection condition determining section)
26 self-position calculator
28 detection condition determining section
29 calculation state determining section
30 road surface condition determining section
31 road surface
32a, 32b patterned light beam
36 plane calculator
Te feature point

The invention claimed is:

1. A self-position calculating apparatus comprising:
    a light projector configured to project a patterned light beam onto a road surface around a vehicle;
    a camera installed in the vehicle, and configured to capture an image of the road surface around the vehicle including an area onto which the patterned light beam is projected; and
    a processor configured to:
        extract a position of the patterned light beam from the image obtained with the camera;
        calculate an orientation angle of the vehicle relative to the road surface from the extracted position of the patterned light beam;
        calculate an amount of change in orientation of the vehicle based on temporal changes in a plurality of feature points on the road surface on the image obtained with the camera; and
        calculate a current position and a current orientation angle of the vehicle by adding the amount of change in the orientation to an initial position and an initial orientation angle of the vehicle, wherein
    if a detected condition of the patterned light beam is equal to or greater than a threshold value, the processor generates a superimposed image by superimposing images in frames obtained with the camera, and extracts the position of the patterned light beam from the superimposed image.

2. The self-position calculating apparatus according to claim 1, wherein the processor sets the number of images to be superimposed to generate the superimposed image depending on a value of brightness of the image obtained with the camera.

3. The self-position calculating apparatus according to claim 1, wherein the processor starts to add the amount of change in the orientation using the orientation angle employed in a previous information process cycle or the initial orientation angle as a starting point while the processor is generating the superimposed image.

4. The self-position calculating apparatus according to claim 1, further comprising a patterned light beam controller configured to modulate the brightness of the patterned light beam with a predetermined modulation frequency, wherein
    the processor generates the superimposed image by superimposing synchronous images obtained by performing synchronous detection with the predetermined modulation frequency on the images obtained with the camera, where the number of the thus-superimposed synchronous images corresponds to a predetermined number of cycles.

5. A self-position calculating method comprising:
    projecting a patterned light beam onto a road surface around a vehicle;
    causing camera to capture an image of the road surface around the vehicle including an area onto which the patterned light beam is projected;
    extracting a position of the patterned light beam from the image obtained with the camera;
    calculating an orientation angle of the vehicle relative to the road surface from the extracted position of the patterned light beam;
    calculating an amount of change in orientation of the vehicle based on temporal changes in a plurality of feature points on the road surface on the image captured with the camera; and
    calculating a current position and a current orientation angle of the vehicle by adding the amount of change in the orientation to an initial position and an initial orientation angle of the vehicle, wherein
    when extracting the position of the patterned light beam, if a detected condition of the patterned light beam is equal to or greater than a threshold value, a superimposed image is generated by superimposing images in frames obtained with the camera, and the position of the patterned light beam is extracted from the superimposed image.

* * * * *